United States Patent
He et al.

(10) Patent No.: US 10,635,878 B2
(45) Date of Patent: Apr. 28, 2020

(54) OPTICAL FINGERPRINT SENSOR WITH FORCE SENSING CAPABILITY

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 159 days.

(21) Appl. No.: 15/653,215

(22) Filed: Jul. 18, 2017

(65) Prior Publication Data

US 2017/0316248 A1 Nov. 2, 2017

Related U.S. Application Data

(63) Continuation-in-part of application No. PCT/US2016/058552, filed on Oct. 24, 2016.

(Continued)

(51) Int. Cl.
*G06K 9/00* (2006.01)
*G06F 3/041* (2006.01)
(Continued)

(52) U.S. Cl.
CPC ........ *G06K 9/00006* (2013.01); *G01L 1/142* (2013.01); *G06F 3/0414* (2013.01);
(Continued)

(58) Field of Classification Search
None
See application file for complete search history.

(56) References Cited

U.S. PATENT DOCUMENTS

| 2002/0076089 A1 | 6/2002 | Muramatsu et al. |
| 2003/0044051 A1 | 3/2003 | Fujieda |

(Continued)

FOREIGN PATENT DOCUMENTS

| CN | 1417751 A | 5/2003 |
| CN | 1529277 A | 9/2004 |

(Continued)

OTHER PUBLICATIONS

International Search Report and Written Opinion dated Dec. 19, 2016 for International Application No. PCT/US2016/058552, filed on Oct. 24, 2016 (14 pages).

(Continued)

*Primary Examiner* — Fred H Hu
(74) *Attorney, Agent, or Firm* — Perkins Coie LLP

(57) ABSTRACT

A device is provided to include a display panel and an optical sensor module. The optical fingerprint sensor can detect an contact input and generate a signal indicative of an image of the fingerprint and to generate a signal indicative of a biometric marker different form the fingerprint. The generated sensor signal includes the signal indicative of the image of the fingerprint and the signal indicative of the biometric marker different from the fingerprint. The optical sensor module can capture different fingerprint patterns at different times to monitor time-domain evolution of the fingerprint ridge pattern deformation that indicates time-domain evolution of a press force from the contact input. The sensing circuitry can process the generated sensor signal to determine whether the contact input associated with the fingerprint belongs to a finger of a live person.

19 Claims, 23 Drawing Sheets

Related U.S. Application Data

(60) Provisional application No. 62/363,823, filed on Jul. 18, 2016, provisional application No. 62/245,942, filed on Oct. 23, 2015.

(51) Int. Cl.
*G01L 1/14* (2006.01)
*G06K 9/62* (2006.01)
*G06K 9/03* (2006.01)

(52) U.S. Cl.
CPC ......... *G06K 9/00013* (2013.01); *G06K 9/036* (2013.01); *G06K 9/6267* (2013.01)

(56) References Cited

U.S. PATENT DOCUMENTS

| | | | |
|---|---|---|---|
| 2007/0211926 A1 | 9/2007 | Shinzaki et al. | |
| 2010/0008552 A1 | 1/2010 | Shin et al. | |
| 2014/0168167 A1 | 6/2014 | Chou | |
| 2015/0146944 A1 | 5/2015 | Pi et al. | |
| 2016/0070404 A1* | 3/2016 | Kerr | G06F 3/0418 345/174 |
| 2016/0246396 A1* | 8/2016 | Dickinson | G06F 3/03545 |
| 2018/0270403 A1* | 9/2018 | Chung | H04N 5/2253 |

FOREIGN PATENT DOCUMENTS

| | | |
|---|---|---|
| CN | 201628972 U | 11/2010 |
| CN | 201950360 A | 1/2011 |
| CN | 202004903 A | 4/2011 |
| CN | 202254168 A | 11/2011 |
| CN | 202153359 U | 2/2012 |
| CN | 202737233 A | 10/2012 |
| CN | 1404002 A | 3/2013 |
| CN | 103729615 A | 4/2014 |
| CN | 103869887 A | 6/2014 |
| CN | 204392227 A | 3/2015 |
| CN | 105138171 A | 12/2015 |
| CN | 106203290 A | 12/2016 |
| CN | 106462765 A | 2/2017 |
| CN | 106716444 A | 5/2017 |
| CN | 106778167 A | 5/2017 |
| CN | 107004126 A | 8/2017 |
| EP | 1708135 B1 | 5/2011 |
| JP | 2002042117 A | 2/2002 |
| WO | 2017070711 A1 | 4/2017 |

OTHER PUBLICATIONS

International Search Report and Written Opinion dated Sep. 10, 2018, for International Application No. PCT/CN2018/090409, filed on Jun. 8, 2018.

International Search Report and Written Opinion dated Jun. 8, 2017, for International Application No. PCT/CN2017/083285, filed on May 5, 2017.

Office Action dated Feb. 6, 2020 for Chinese Patent Application No. 201680004141.8 (24 pages).

* cited by examiner

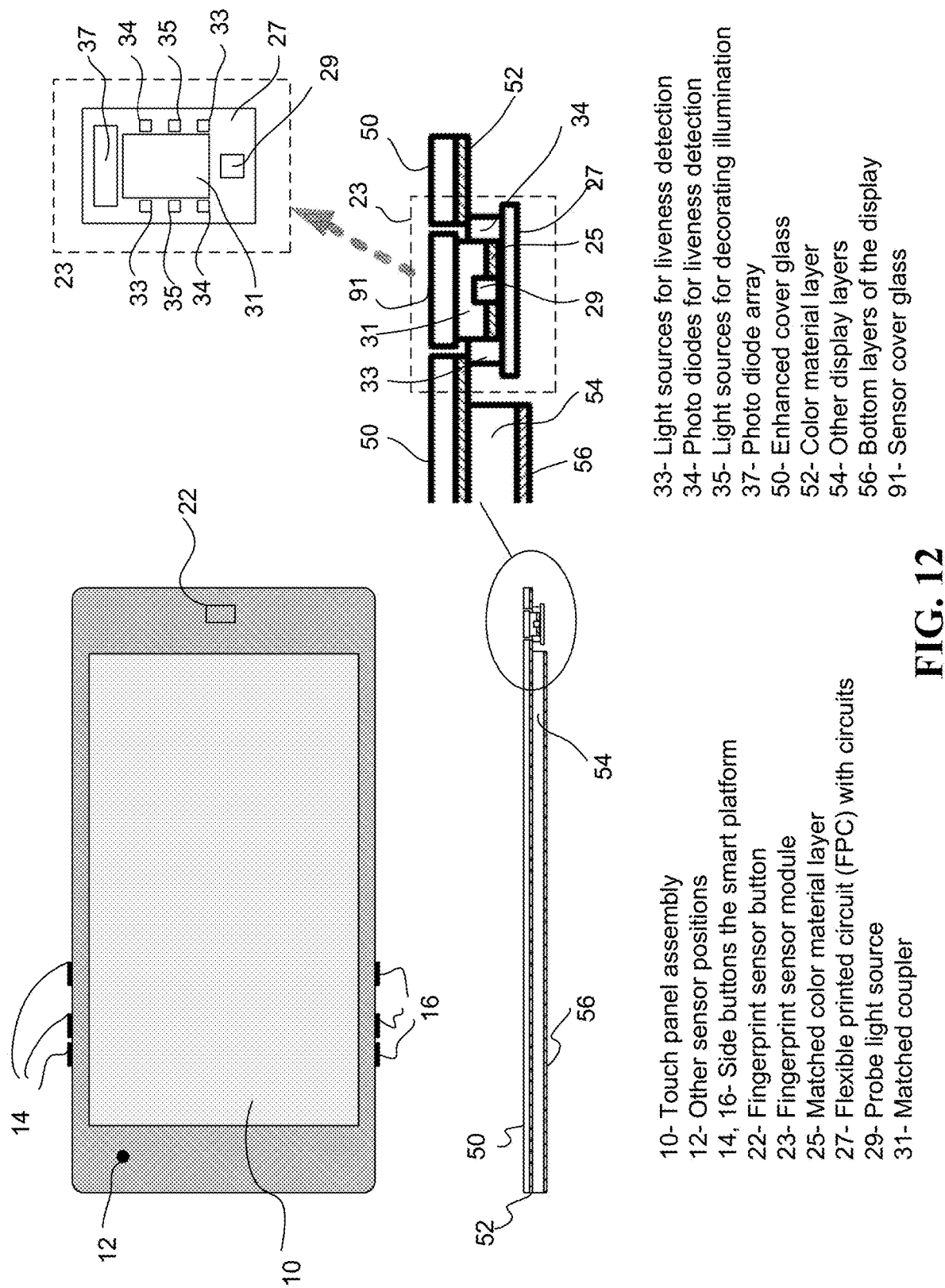

FIG. 12

- 10- Touch panel assembly
- 12- Other sensor positions
- 14, 16- Side buttons the smart platform
- 22- Fingerprint sensor button
- 23- Fingerprint sensor module
- 25- Matched color material layer
- 27- Flexible printed circuit (FPC) with circuits
- 29- Probe light source
- 31- Matched coupler
- 33- Light sources for liveness detection
- 34- Photo diodes for liveness detection
- 35- Light sources for decorating illumination
- 37- Photo diode array
- 50- Enhanced cover glass
- 52- Color material layer
- 54- Other display layers
- 56- Bottom layers of the display
- 91- Sensor cover glass 26- Matched color material layer
27- Flexible printed circuit (FPC) with circuits
29- Probe light source
31- Matched coupler
33- Light sources for liveness detection
35- Light sources for decorating illumination
37- Photo diode array
39- Spacer material
41- Light path window
43- Touching finger
45- Sensing surface
51- Sensor cover glass
53- Color material layer 1423- Display assembly
1431- Enhanced cover glass
1433- OLED display module
1435— Device ciruitry
1613- Viewing Zone /Sensing Window
1615- Effective Fingerprint Sensing Zone

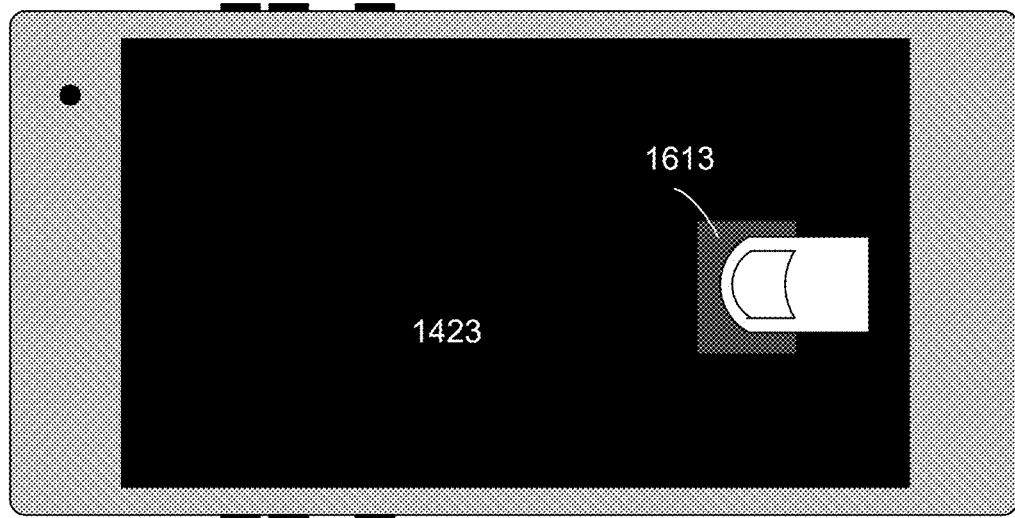

FIG. 19A

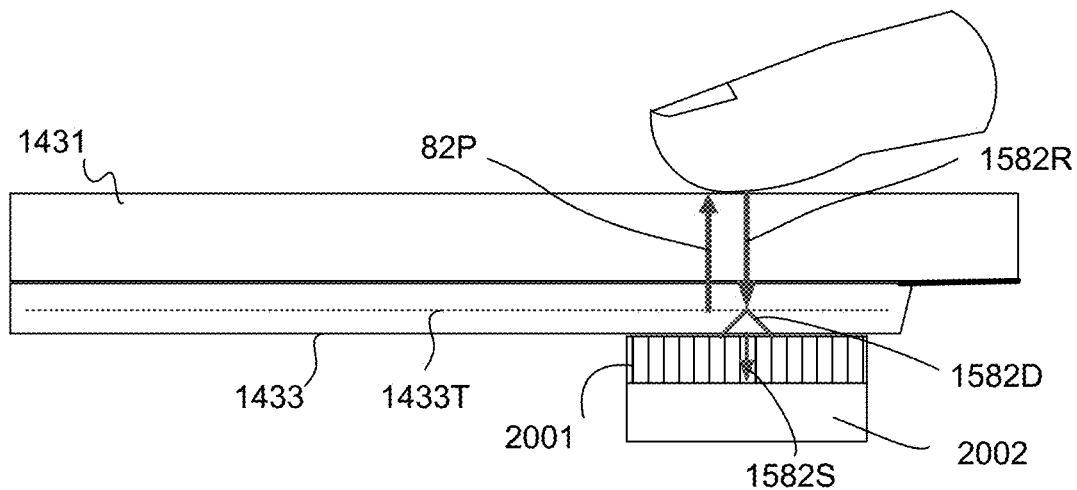

FIG. 19B

1423- Display screen area
1431- Cover glass
1433- OLED display module
1433T- TFT layer of the OLED display module
1613- Fingerprint sensing window within the display screen area
2001- Optical Collimators
2002- Photo detector array
1582P- Light incident to the fingerprint sensing surface
1582R- Light reflected from the fingerprint sensing surface
1582D- Light from small hole arrays on TFT substrate
1582S- Light that goes through the optical collimator array

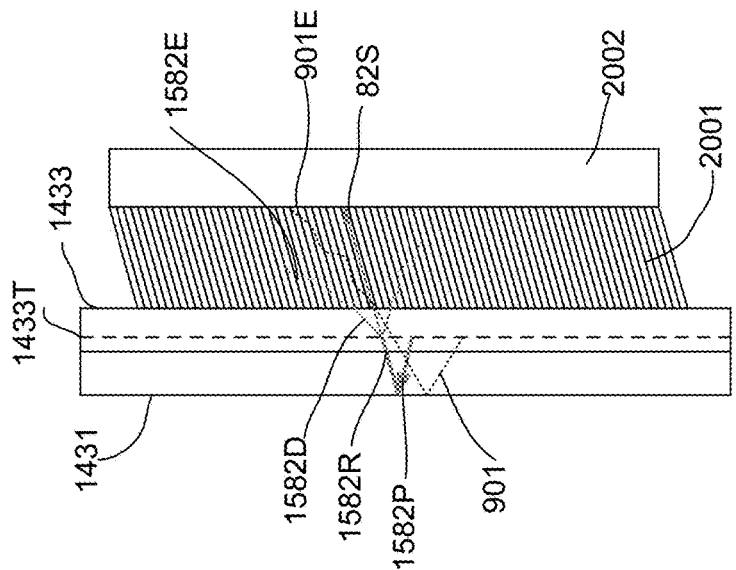

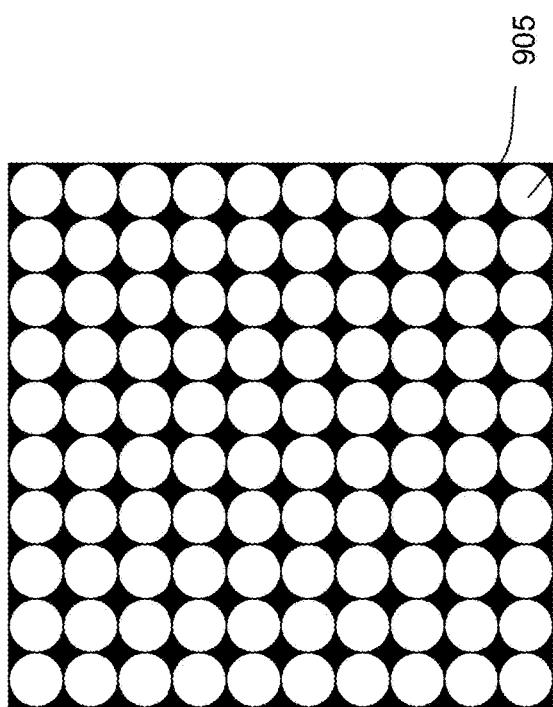

1431- Cover glass
1433- OLED display module
1433T- TFT layer of OLED display module
2001- Optical Collimators
2002- Photo detector array
1582P- Light incident to the fingerprint sensing surface
1582R- Light reflected from the fingerprint sensing surface
1582D- Light diffracted from TFT small holes of the OLED display module
1582S- Light that goes through the optical collimator array
1582E- Light absorbed by the optical collimator array
901- Other lights
901E- Light absorbed by the optical collimator array
903- Optical collimator array
905- Absorption materials

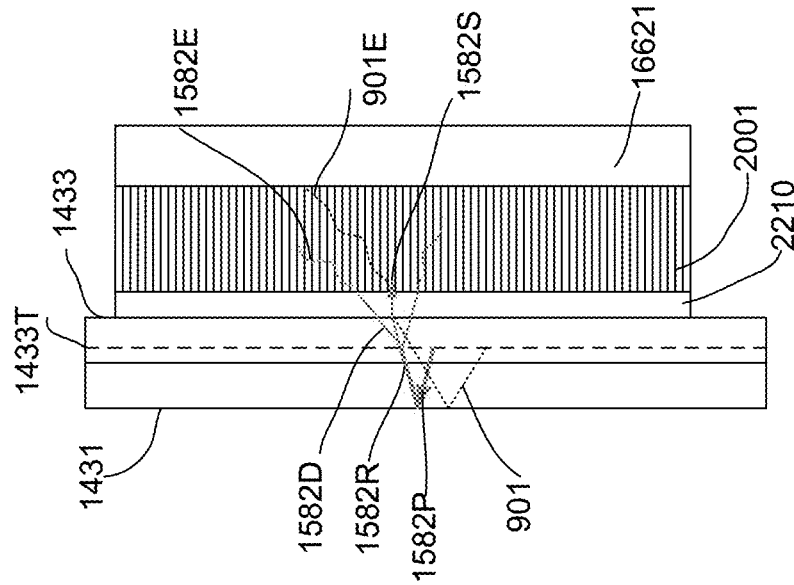

FIG. 22A

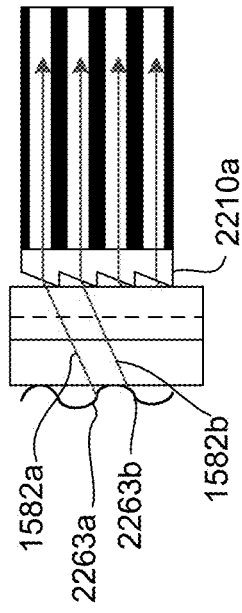

FIG. 22B

1431- Cover glass
1433- OLED display module
1433T- TFT layer of OLED display module
2210- Viewing angle adaptor optical layer
2210a- Detail of the viewing angle adaptor layer
2001- Light Collimator
1621- Photo detector array
2263a, 2263b- Different positions in fingerprint valley
1582a, 1582b- Light from different fingerprint valley positions
1582P- Light shine to finger
1582R- Light reflected from finger surface
1582D- Light diffracted from TFT small holes
1582S- Light goes through collimator
1582E- Light absorbed by collimator
901- Other lights
901E- Light absorbed by collimator

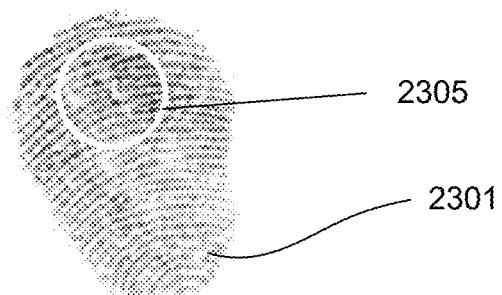
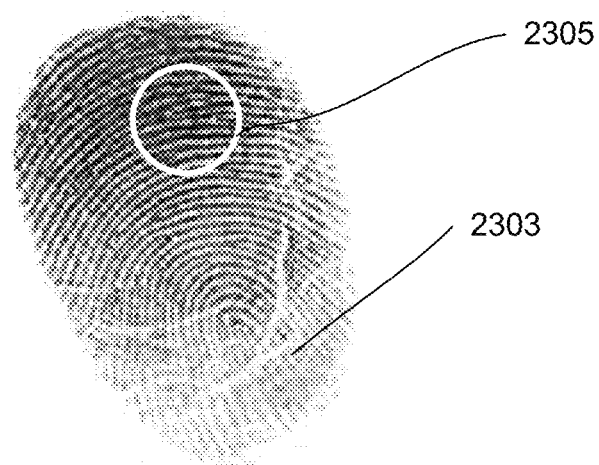
2301- Lightly pressed fingerprint
2303- Heavily pressed fingerprint
2305- Integration zone
FIG. 23

OPTICAL FINGERPRINT SENSOR WITH FORCE SENSING CAPABILITY

CROSS REFERENCE TO RELATED APPLICATIONS

This patent application claims the priorities and benefits of U.S. Provisional Patent Application No. 62/363,823, filed on Jul. 18, 2016 and is a continuation-in-part of International Patent Application No. PCT/US2016/058552, filed on Oct. 24, 2016, which claims the priority and benefits of U.S. Provisional Patent Application No. 62/245,942, filed on Oct. 23, 2015. The entire contents of the before-mentioned patent applications are incorporated by reference as part of the disclosure of this application.

TECHNICAL FIELD

This patent document generally relates to fingerprint recognition and its applications for securely accessing an electronic device or an information system.

BACKGROUND

Fingerprints can be used to authenticate users for accessing electronic devices, computer-controlled systems, electronic databases or information systems, either used as a stand-alone authentication method or in combination with one or more other authentication methods such as a password authentication method. For example, electronic devices including portable or mobile computing devices, such as laptops, tablets, smartphones, and gaming systems can employ user authentication mechanisms to protect personal data and prevent unauthorized access. In another example, a computer or a computer-controlled device or system for an organization or enterprise should be secured to allow only authorized personnel to access in order to protect the information or the use of the device or system for the organization or enterprise. The information stored in portable devices and computer-controlled databases, devices or systems, may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, these data may be accessed by others, causing loss of privacy of individuals or loss of valuable confidential information. Beyond security of information, securing access to computers and computer-controlled devices or systems also allow safeguard the use of devices or systems that are controlled by computers or computer processors such as computer-controlled automobiles and other systems such as ATMs.

Security access to a device such as a mobile device or a system such as an electronic database and a computer-controlled system can be achieved in different ways such as use of user passwords. A password, however, may be easily to be spread or obtained and this nature of passwords can reduce the level of the security. Moreover, a user needs to remember a password to use electronic devices or systems, and, if the user forgets the password, the user needs to undertake certain password recovery procedures to get authenticated or otherwise regain the access to the device and such processes may be burdensome to users and have various practical limitations and inconveniences. The personal fingerprint identification can be utilized to achieve the user authentication for enhancing the data security while mitigating certain undesired effects associated with passwords.

Electronic devices or systems, including portable or mobile computing devices, may employ user authentication mechanisms to protect personal or other confidential data and prevent unauthorized access. User authentication on an electronic device or system may be carried out through one or multiple forms of biometric identifiers, which can be used alone or in addition to conventional password authentication methods. One form of biometric identifiers is a person's fingerprint pattern. A fingerprint sensor can be built into an electronic device or an information system to read a user's fingerprint pattern so that the device can only be unlocked by an authorized user of the device through authentication of the authorized user's fingerprint pattern.

SUMMARY

The examples of implementations described in this patent document provide fingerprint sensor designs that use optical sensors for sensing fingerprints. The described fingerprint sensor designs can be used in various devices, systems or applications, including mobile applications, and various wearable or portable devices (e.g., smartphones, tablet computers, wrist-worn devices), larger electronic devices or systems.

In one aspect, an electronic device having an optical fingerprint sensing module is provided to include a display panel that displays images and contents and receives user contact inputs; and an optical sensor module placed underneath the display panel and configured to detect a presence of a received contact input associated with a fingerprint to generate a first signal indicative of an image of a spatial pattern of the fingerprint and a second signal indicative of a biometric marker that is different from the spatial pattern of the fingerprint and represents a property of a live person, the optical sensor module including an optical sensor array positioned to receive reflected probe light that carries information of the received contact input and to produce an optical sensor signal. The optical sensor module captures different fingerprint patterns at different times to monitor time-domain evolution of the fingerprint ridge pattern.

In another aspect, an electronic device having an optical fingerprint sensing module is provided to include a display panel that displays images and contents and receives user contact inputs; and an optical sensor module placed underneath the display panel and configured to detect a presence of a received contact input associated with a fingerprint to generate a first signal indicative of an image of a spatial pattern of the fingerprint and a second signal indicative of a biometric marker that is different from the spatial pattern of the fingerprint and represents a property of a live person. The optical sensor module includes an optical sensor array positioned to receive reflected probe light that carries information of the received contact input and to produce an optical sensor signal, and an optical collimator array located between the display panel and the optical sensor array to spatially filter the returned probe light for optical detection by the optical sensor array. In some implementations, the optical sensor module further includes an optical layer between the optical collimators and the display panel to select angled probe light returned from the display panel to enter the optical collimators while reducing an amount of the returned probe light that is perpendicular to the display panel and enters the optical collimators.

In another aspect, an electronic device having an optical fingerprint sensing function is provided to include a touch receiving surface including a touch area for receives a contact input; an optical sensor module that detects a presence of a received contact input associated with a fingerprint on the touch receiving surface to generate a first signal indicative of an image of a spatial pattern of the fingerprint and a second signal indicative of a biometric marker that is different from the spatial pattern of the fingerprint and represents a property of a live person. The optical sensor module includes: a light source to produce probe light projected onto the touch receiving surface, and an optical sensor array positioned to receive probe light from the touch receiving surface that carries information of the received contact input and to produce an optical sensor signal. The device may further include processing circuitry that is communicatively coupled to receive the optical sensor signal to process the first signal to determine whether the detected image matches a fingerprint pattern of an authorized user and to process the second signal to determine whether the biometric marker indicates that the contact input associated with the fingerprint is from a finger of a live person.

In another aspect, the optical fingerprint sensor of the disclosed technology can be implemented to provide one or more of the following features. The optical fingerprint sensor includes a light source, coupler, spacer, photo diode array, and cover glass. The spacer may be made of glass material, adhesive material, or even air gap or vacuum. The coupler may be made of glass material, adhesive material, or even air or vacuum. The cover glass may be partial of the display cover glass, or separate cover glass. Each of the mentioned coupler, spacer, and cover glass may be of multiple layers.

The disclosed technology can be implemented in ways that provide flexibilities to control the signal contrast by matching the materials shapes and refractive indexes. By matching the probe light beam incident angle, divergent angle, and the materials of the involved coupler, spacer and cover glass, the probe light beam may be controlled to be totally reflected or partially reflected at the sensing surface for different touching materials.

In some implementations, the disclosed optical fingerprint sensor can be configured to provide a water-free fingerprint sensing operation to improve the fingerprint sensing performance. A typical smartphone cover glass has a refractive index of about 1.50. One design is to use low refractive index material ($MgF_2$, $CaF_2$, Polymer etc.) to form the coupler. The disclosed technology can be used to control the local probe light beam incident angle at the sensing surface to be about 68.5°. The total reflection angle is about 62.46° when water touches the sensing surface of the optical fingerprint sensor, and the total reflection angle is about 73.74° when the ridges of a fingerprint touch the sensing surface. The total reflection angle is about 41.81° when nothing touches the sensing surface. In this design, at the water soaking area, the probe light is totally reflected to the photo diode array; at the fingerprint ridges touching positions, less than 5% of the probe light is reflected to the photo diode array; and at the dry fingerprint valleys positions, the probe light beam is also totally reflected to the photo diode array. This means that only the fingerprint ridges generate signals that are detected.

Sweat has a refractive index that is lower than the finger's skin. The disclosed technology provides a solution to distinguish the sweat pores in the fingerprint.

When air gap is used to form the coupler, total reflection at the sensing surface does not occur. The reflectance difference among different touching materials (the fingerprint ridges, fingerprint valleys, and other contaminations) can be used to detect the fingerprint image.

Due to the light path compression effect, the sensing area size may be greater than the photo diode array size.

The light source may be a point light source installed at proper distance.

The probe light beam may be collimated by spherical lenses, cylinder lenses, or aspheric lenses.

The probe light beam may be of proper divergent angle. The probe light beam may also be divergent or convergent.

Due to the light path compression effect, the coupler may be very thin. For example, less than 1 mm thickness $CaF_2$ coupler can be used to realize even 10 mm sensing area size. In this example, the image compression ratio is 1:10. This helps to reduce the sensor cost.

The photo diode array is installed on one end of the coupler instead of under the coupler. This design leaves the flexibility to apply color paint, illumination light etc. to compensate the color or decorate the sensor area.

The probe light source may be modulated to help reduce the influence of the background light. The photo diode array is designed to work well in any illumination environments.

The cover glass thickness does not limit the fingerprint sensing.

The principle can be used to build optical touch panel.

In another aspect, the optical fingerprint sensor of the disclosed technology can be implemented to perform live-finger detection including the following:

The optical fingerprint sensor can detect whether the touching material is a live-finger and can improve the security of the sensor.

Specified light sources and detectors can be used to detect whether the object touching the sensing area is a live-finger or a nonliving material.

When single wavelength is used, the heartbeat detection provides a reliable criterion to detect whether the object touching the sensing area is a live-finger or a nonliving material, including the fingerprint of a live-finger.

When two or more wavelengths are used, the extinction ratio of the wavelengths are compared to detect whether the object touching the sensing area is a live-finger or a nonliving material, including the fingerprint of a live-finger.

The fingerprint sensor light sources and photo diode array can be used to detect whether the object touching the sensing area is a live-finger or a nonliving material, including the fingerprint of a live-finger.

The dynamic fingerprint images can be used to detect whether the object touching the sensing area is a live-finger or a nonliving material, including the fingerprint of a live-finger.

The dynamic fingerprint images can also be used to detect the press force when a live finger is touching the sensing area.

Multiple security level can be set up for different security requirement tasks.

In yet another aspect, the optical fingerprint sensor can be implemented to enable various decorative elements including the following:

The bottom surface of the coupler can be painted with same color or pattern layers to match with the platform surface color.

The bottom surface of the coupler can be painted with different color or pattern layers to show new styles outlooking.

Color light sources can be installed around the coupler to decorate the sensor area.

In yet another aspect, the optical fingerprint sensor packaged as a separate button can perform the same fingerprint detection and live-finger detection as described above. In addition, the optical fingerprint sensor package as a separate button can be implemented to perform the following features:

The cover glass and related spacer material feature flexibility in the thickness according to the applications.

Especially, it is a practical package not to use cover glass and spacer material.

Another practical design is to use a thin layer of cover glass to protect the coupler. The cover glass may be of high hardness.

To use colored glass or other optical materials to build the cover is also practical.

The package method provides a solution to build a compact button that can detect the fingerprint with improved security.

Other mechanical parts may be integrated to make the module strong.

In yet another aspect, the disclosed technology can be implemented to provide an electronic device having an optical fingerprint sensing module to include a touch sensing display panel including a touch sensing and displaying area for displaying images and contents and for receiving user contact inputs; a top transparent cover formed on top of the touch sensing display panel and operable as a top touch sensing surface for a user to provide user contact input to the touch sensing display panel and to transmit light for a user to view images displayed by the touch sensing display panel; and an optical sensor module placed underneath the top transparent cover and displaced from the touch sensing display panel. The optical sensor module is configured to detect a presence of a received contact input associated with a fingerprint on the top touch sensing surface to generate a first signal indicative of an image of a spatial pattern of the fingerprint and a second signal indicative of a biometric marker that is different from the spatial pattern of the fingerprint and represents a property of a live person. The optical sensor module includes a probe light source to produce probe light projected onto the top touch sensing surface, and an optical sensor array positioned to receive reflected probe light from the top touch sensing surface that carries information of the received contact input and to produce an optical sensor signal. The probe light source produces probe light of two different wavelengths with different optical absorptions by blood. The first signal indicative of the image of the spatial pattern of the fingerprint is captured by the optical sensor array by sensing the reflected probe light at each of the two different wavelengths, and the second signal indicative of the biometric marker is carried by differences in the reflected probe light at the two different wavelengths.

The above and other aspects and features are described in greater detail in the attached drawings, the description and the claims.

BRIEF DESCRIPTION OF THE DRAWINGS

FIG. 12 is a diagram showing an exemplary optical fingerprint sensor packaged as a separate button.

FIGS. 16A-16B, 17A-17B, 18 and 19A-19B show examples of integrating optical sensor modules under OLED screens to provide optical sensing functions.

FIGS. 20A-20B show an exemplary implementation of the design in FIG. 18 and FIGS. 19A-19B.

FIGS. 22A-22B show an example of an optical fingerprint senor under an OLED/LCD display panel having an optical deflection or diffraction device or layer.

FIG. 23 shows two different fingerprint patterns of the same finger under different press forces to illustrate the operation of the optical sensor module for capturing different fingerprint patterns at different times to monitor time-domain evolution of the fingerprint ridge pattern.

DETAILED DESCRIPTION

The fingerprint sensing described in this patent document includes optical sensing of a fingerprint pattern.

Figure 1A:
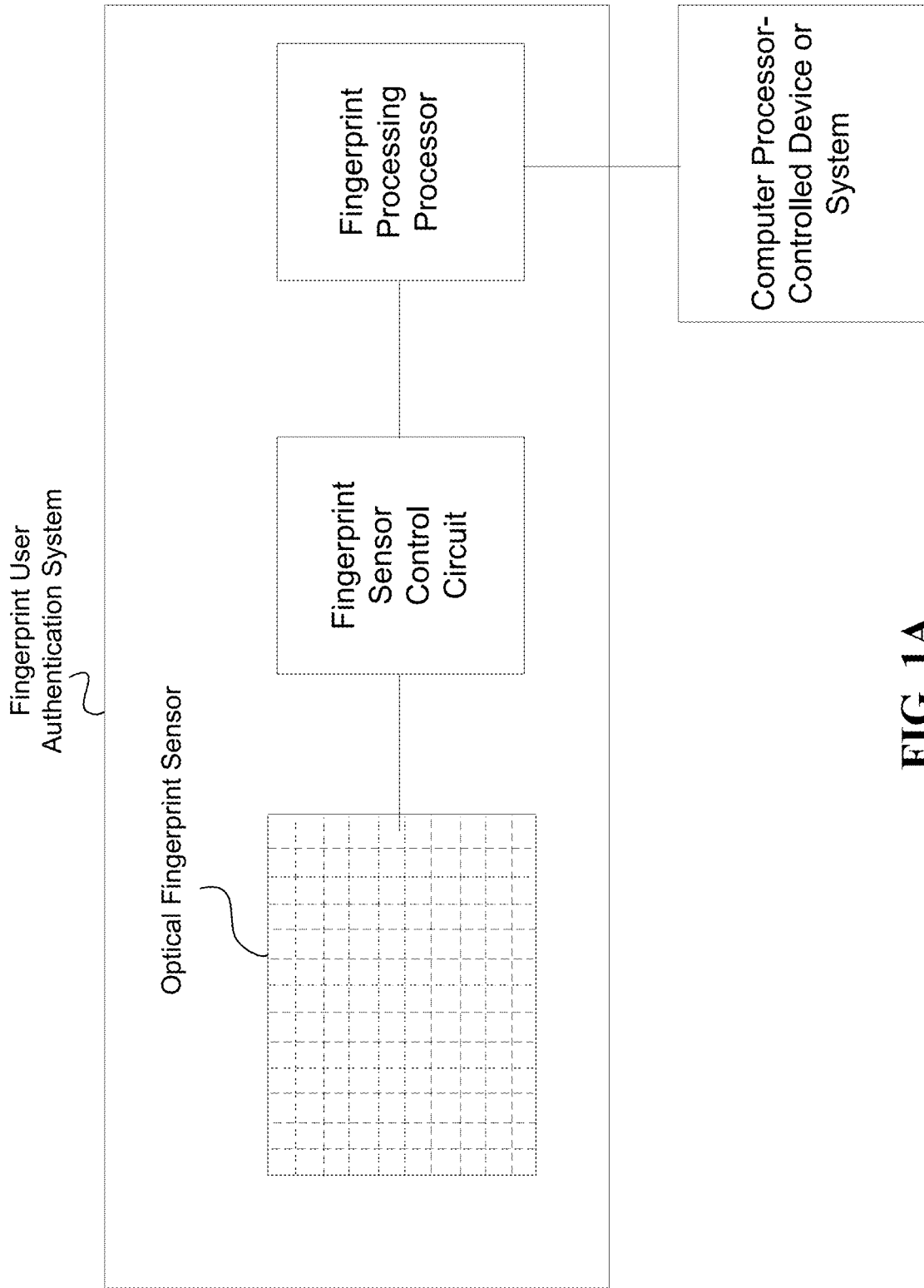
FIG. 1A is a block diagram of an example of an optical sensing based fingerprint user authentication system that controls the access to a computer processor controlled device or system.
Figure 1B:
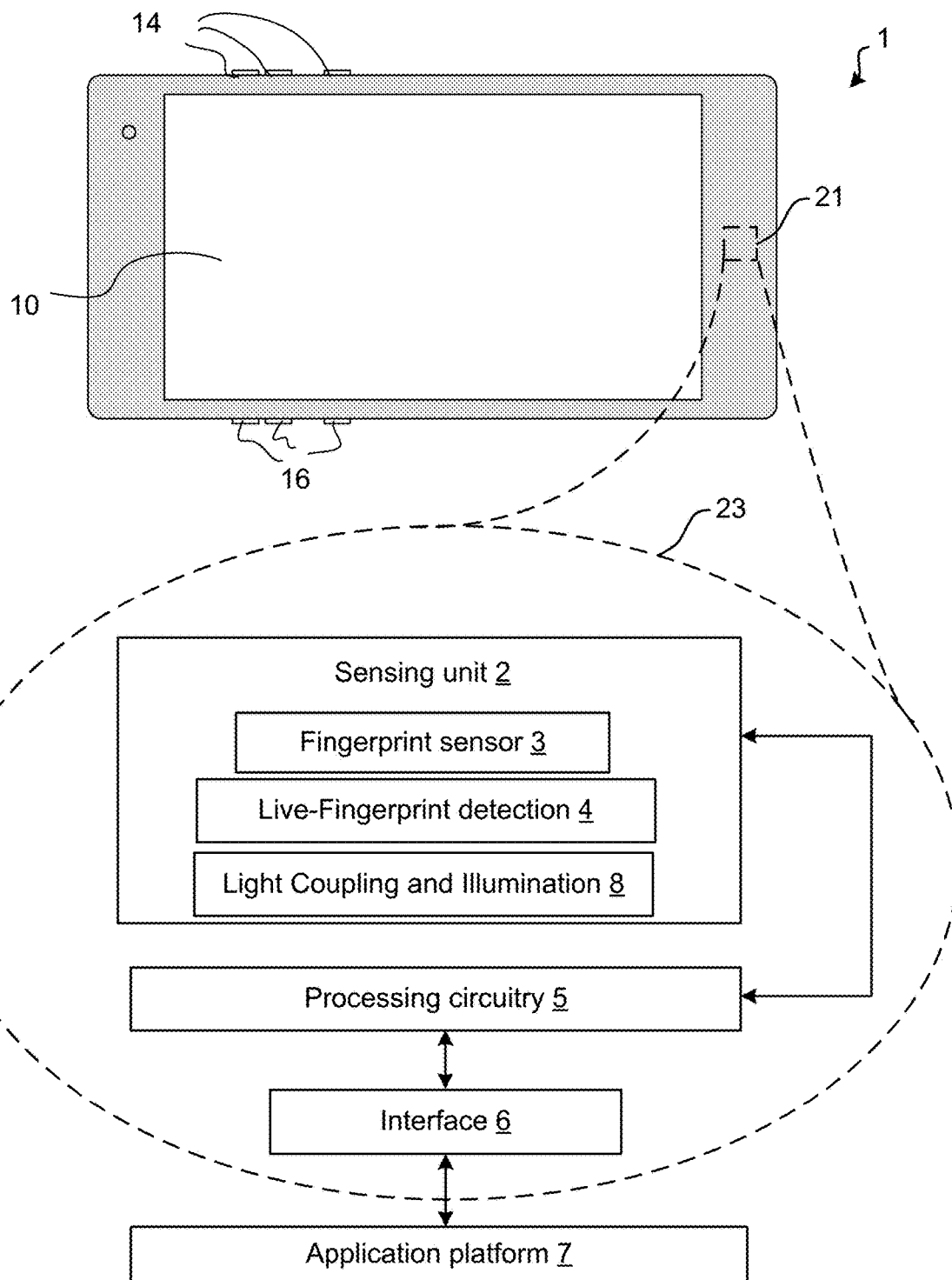
FIG. 1B is a block diagram showing an exemplary fingerprint sensor device implementing in a mobile device such as a smartphone based on the design in FIG. 1A.

FIG. 1A is a block diagram of an example of an optical sensing based fingerprint user authentication system that controls the access to a computer processor controlled device or system. The system uses an optical fingerprint sensor with an array of optical detectors to capture an optical image of received light that carries the fingerprint pattern from a finger that is touched on the optical fingerprint sensor sensing surface that is illuminated by an illumination light beam. The system includes a fingerprint sensor control circuit that receives the outputs from the optical detectors in the optical fingerprint sensor, and a digital fingerprint processing processor which may include one or more processors for processing fingerprint patterns and determining whether an input fingerprint pattern is one for an authorized user. The fingerprint sensing system may compare a captured fingerprint to a stored fingerprint to enable or disable functionality in a device or system that is secured by the fingerprint user authentication system. For example, the fingerprint user authentication system at an ATM may determine the fingerprint of a customer requesting to access funds. Based on a comparison of the customer's fingerprint to one or more stored fingerprints, the fingerprint user authentication system may cause the ATM system to allow access to funds and may identify the customer in order to associate an appropriate account to credit or deduct the requested funds. A wide range of devices or systems may be used in connection with the disclosed optical fingerprint sensors, including mobile applications, and various wearable or portable devices (e.g., smartphones, tablet computers, wrist-worn devices), larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others. FIG. 1B illustrates an example for a smartphone or a portable device where the fingerprint user authentication system is a module integrated to the smart phone.

Fingerprint sensing is useful in mobile applications and other applications that use secure access. For example, fingerprint sensing can be used to provide secure access to a mobile device and secure financial transactions including online purchases. It is desirable to include robust and reliable fingerprint sensors features suitable for mobile devices. For example, it is desirable for fingerprint sensors in mobile devices to have a small footprint and thin to fit into the highly limited space in mobile devices; it is also desirable to include a protective cover to protect such a fingerprint sensor from various contaminants.

The optical sensing technology described in this patent document for fingerprint sensing can be implemented to provide high performance fingerprint sensing and can be packaged in compact sizes to fit into mobile and other small device packaging. In capacitive fingerprint sensors, the sensing is based on measuring the capacitance between the sensing electrode and a finger surface due to their capacitive coupling. As the protective cover over the capacitive sensor pixels becomes thicker, the electrical field sensed by each capacitive sensor pixel disperses quickly in space leading to a steep reduction in the spatial resolution of the sensor. In connection with this reduction of the sensing spatial resolution, the sensor signal strength received at each sensor pixel also reduces significantly with the increase in thickness of the protective cover. Thus, when the protective cover thickness exceeds a certain threshold (e.g., 300 µm), it can become more difficult for such capacitive sensors to provide a desired high spatial resolution in sensing fingerprint patterns and to reliably resolve a sensed fingerprint pattern with an acceptable fidelity.

The disclosed technology can be implemented to provide optical fingerprint sensor designs in thin optical fingerprint sensor packages for easy integration into a mobile device or other compact devices. In some implementations, the optical fingerprint sensors of the disclosed technology use matched light coupling solutions to provide optical fingerprint sensing at low cost, high performance, and flexible package structures. The disclosed optical fingerprint sensors may also be configured to provide live-finger detection to improve the device security based on fingerprint sensing. In addition, disclosed optical fingerprint sensor solutions may include various decorative options that provide customized appearance of the platforms that integrates the sensor.

Examples of implementations of the disclosed technology can be used to introduce an optical technology for sensing finger properties including fingerprint detection. The optical technology can be used for a wide range of devices and systems including those with a display structure. An optical fingerprint sensor based on the disclosed technology can be integrated under the same cover of a display such as a touch sensing display device or be packaged in a discrete device.

The performance of the optical fingerprint sensors based on the disclosed technology is not limited by the package cover thickness that may hinder capacitive fingerprint sensors. In this regard, an optical fingerprint sensor based on the disclosed technology can be implemented into a thin package by using suitable optical imaging capture configurations, including configurations that are free of imaging lenses or prisms that tend to render the optical imaging modules bulky. Implementations of optical fingerprint sensors based on the disclosed technology can be provide color matching design features to allow the colors of the optical fingerprint sensing areas to be in certain desired colors, e.g., matching colors of the surrounding structures.

In some implementations, the optical fingerprint sensors of the disclosed technology can be packaged under the platform screen cover glass without modifying the cover thickness and color. The optical fingerprint sensor can include an optical sensor array, e.g., a photo diode array, or a CMOS sensor array, and the optical sensor array can be dimensioned to a compact size due to the contribution of the compressed light path structure. Moreover, the design provides flexibility to decorate the sensor area, for example, with color light illumination.

In some implementations, in addition to the optical sensing of a fingerprint, optical sensing of a biometric indication is provided to indicate whether an input of the fingerprint pattern is from a live person. This additional optical sensing feature can be used to meet the needs for defeating various ways that may compromise the secured or authorized access to fingerprint-protected devices or systems. For example, a fingerprint sensor may be hacked by malicious individuals who can obtain the authorized user's fingerprint, and copy the stolen fingerprint pattern on a carrier object that resembles a human finger. Such unauthorized fingerprint patterns may be used on the fingerprint sensor to unlock the targeted device or system. Hence, a fingerprint pattern, although a unique biometric identifier, may not be by itself a completely reliable or secure identification. The techniques, devices and systems described in this document supplement the disclosed optical sensing based fingerprint authentication technology further improve the security level by using an optical sensing technique to determine whether the input fingerprint is from a live person.

Fingerprint Sensor Circuitry and Live Finger Detection

FIG. 1B is a block diagram showing an exemplary fingerprint sensor device 23 implementing in a mobile device such as a smartphone, a tablet or a portable computing device 1 with a touch sensing display screen or touch panel 10 for both touch sensing user inputs and display images and functions of the device 1. This is specific implementation example of the general optical fingerprint sensing controlled system in FIG. 1A. The touch panel or sensing display screen 10 can be implemented based on various touch sensing display designs, including, a display screen having light emitting display pixels without using backlight where each individual pixel generates light for forming a display image on the screen such as an organic light emitting diode (OLED) display screens or electroluminescent display screens or other display screens such as LCD-based touch sensing display screens. The touch sensing display panel includes a touch sensing and displaying area for both displaying images and contents and for receiving contact inputs from a user.

A fingerprint sensor device marker 21 is shown in FIG. 1B to illustrate an exemplary position of the fingerprint sensor device 23 with respect to the mobile device 1. The fingerprint sensor device 23 includes a sensing unit or circuitry 2 that performs fingerprint scanning, live-fingerprint detection, and sensing area decorative functions. The sensing unit 2 is communicatively coupled to processing circuitry 5 that handles signal flows from the sensing unit 2 and to process the signals associated with fingerprint scanning and live-fingerprint judgment, etc.

An interface 6 bridges a signal flow between the fingerprint sensor device 23 and an application platform or a host device 7, which is the smartphone 1 in this example. Examples of the application platform 7 include the smart phone 1, a tablet computer, a laptop computer, a wearable device, and other electronic device where a secure access is desired. For example, the interface 6 can communicate with a central processor (either directly or through other components, such as a bus or an interface) of the smartphone 1 to provide sensor data from the fingerprint sensor device 23 under the fingerprint sensor device marker 21 including fingerprint image data and information indicative of whether the detected fingerprint making the contact input belongs to a live fingerprint.

In the illustrated example in FIG. 1B, the sensing unit 2 includes a fingerprint sensor 3, a live-fingerprint detector 4, and a light coupling and illumination unit 8. The fingerprint sensor 3 captures a fingerprint pattern and can be implemented using one or more optical techniques. The live-fingerprint sensor 4 can include circuitry for analyzing fingerprint image dynamics. The live finger sensor 4 can include circuitry, such as optical sensors, for sensing additional biometric markers, such as heartbeat or heart rate from the scanned fingerprint.

The live finger sensor 4 is designed to detect whether a fingerprint is from a finger of a live person and this live finger detection or judgment is based on the fact that a finger of a live person may exhibit certain motions or physical traits that are typically associated with a live person, e.g., a pulsing signal due to blood flows through the user's vessels. For example, blood cells manifest different optical absorption spectral signatures at visible wavelengths (e.g., a higher optical absorption) and near IR wavelengths (e.g., a lower optical absorption than that is a visible wavelength). Such different optical absorption signatures by blood can be optically captured by the liver finger sensor 4. Other signatures of blood flows may be reflected by pressure variations in blood vessels. In some implementations, the live finger sensor 4 can include a pressure sensor, an optical sensor, or other sensors that can detect the moving, stretching, or pulsing of a live finger. For example, an optical sensor can include a light source, such as a light emitting diode (LED) or a laser diode (LD) to emit light and a light detector, such as a photodiode to detect scattered light scattered from the finger responsive to the emitted light. When the light propagates through the finger tissues or the blood cells, the light is partially absorbed and partially scattered. The live finger movement or the blood flow causes a change in the light absorption cross-section. The photodiode detects this kind of change and the detected signal can be used to indicate whether a fingerprint that is being presented to the device is from a live person.

The light coupling and illumination unit 8 creates a probe light beam at the fingerprint sensing surface which generates a reflected probe light beam into an optical sensor array (e.g., a photo diode array or CMOS sensor array) of the sensing unit. The fingerprint signals are generated when the probe light beam meets with the finger skin that touches the sensing surface. The fingerprint sensor 3 acquires the fingerprint signals by detecting the reflection differences of the probing light beam at the sensing surface across a fingerprint pattern where locations of the skin of fingerprint ridges in a finger in contact with the sensing surface creates a lower optical reflection than the optical reflections at locations of fingerprint valleys in the finger where the finger skin does not contact the sensing surface. The spatial distribution the above reflection differences across the touched sensing surface by the finger is carried by the reflected optical probe light beam as an optical image that is detected by the array of optical detectors in the fingerprint sensor 3.

The disclosed technology provides for two fingerprint sensor packaging techniques to implement fingerprint detection and live-finger detection. The first packaging technique is to package the fingerprint sensor under the screen cover glass of the platform, such as a smartphone. The second packaging technique is to package the fingerprint sensor as a separate fingerprint sensing button.

Fingerprint Sensor Packaged Under the Screen Cover Glass

Figure 2:
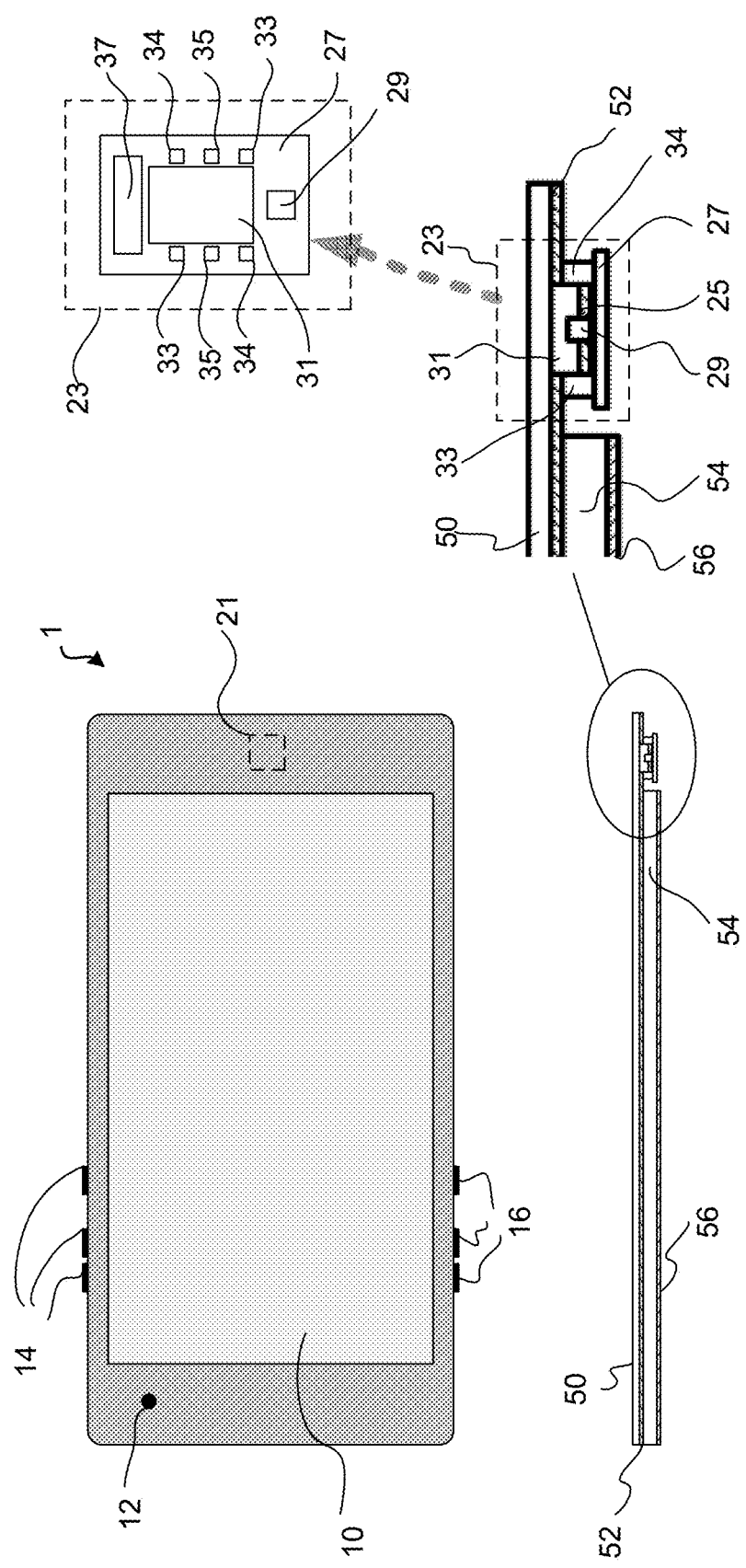
FIG. 2 is a diagram showing an exemplary optical fingerprint sensor packaged under a screen cover glass of a platform, such as a smart phone.
Figure 3:
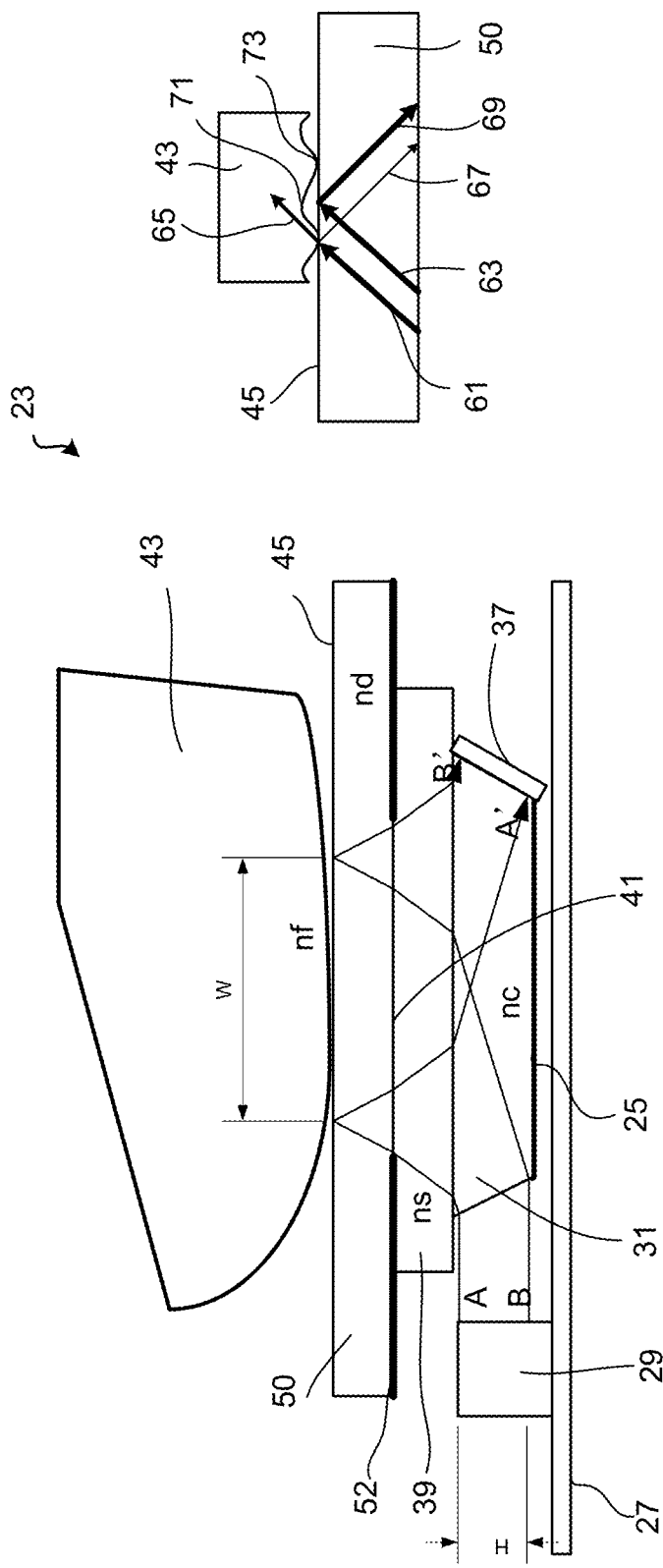
FIG. 3 is a diagram showing an exemplary fingerprint sensing light path.

FIG. 2 is a diagram showing an exemplary optical fingerprint sensor packaged under a screen cover glass of a platform, such as a smart phone, a tablet or a portable electronic device. FIG. 3 further illustrates an exemplary fingerprint sensing light paths of the device in FIG. 2.

In FIG. 2, the exemplary optical fingerprint sensor 23 is packaged under a screen cover glass, such as an enhanced cover glass 50 of a platform 1, such as a smartphone. The location of the optical fingerprint sensor 23 is shown by a fingerprint sensor mark 21 in the top-down view in the upper left side of FIG. 2. The smartphone platform 1 includes a touch panel assembly 10, other sensors 12, such as a camera, and physical buttons 12 and 16 on the side. Under the cover glass 50 can include a color material layer 52, display layers 54 (e.g., OLED layers or LCD layers) as part of the display screen in the touch panel assembly 10, and bottom layers 56 of the display screen in the touch panel assembly 10. Also, the touching sensing layers may also be placed to overlay the display layers 54 to provide the touching sensing functions.

In the optical fingerprint sensor design in FIG. 2, the packaging design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. Under the illustrated design in FIG. 1B, the fingerprint sensor 23 formed in the area underneath fingerprint sensor device marker 21 for optical fingerprint is located under the top cover glass or layer 50 so that the top surface of the cover glass or layer 50 serves as the top surface of the device as a contiguous and uniform glass surface across both the display screen of the touch display assembly 10 and the optical detector sensor module 23. In the examples shown in FIGS. 1-6, the optical sensor module is located on one side of the transparent substrate 50 such as a glass cover that is contiguous without any opening at or near the optical sensor module. This design is different various smartphones with a fingerprint sensor and provides unique features and benefits. This design for integrating optical fingerprint sensing and the touch sensitive display screen under a common and uniform surface provides benefits, including improved device integration, enhanced device packaging, enhanced device resistance to failure and wear and tear, and enhanced user experience. In some implementations of the optical sensing of fingerprints and other sensing operations, such as the design in FIG. 12, the optical sensor module may be packaged in a discrete device configuration in which the optical sensor module is a distinct structure that has a structural border or demarcation with the display screen, e.g., a button like fingerprint sensor structure in an opening of the top glass cover in some mobile phone designs based on all optical sensing or a hybrid sensing with both capacitive sensing and optical sensing.

The optical fingerprint sensor 23 disposed under the cover glass 50 can include an optical coupler 31 disposed over a matched color material layer 25 and a probe light source 29. The matched coupler 31, the matched color material layer 25, and the probe light source 29 are disposed over a circuit 27, such as a flexible printed circuit (FPC) with desired circuit elements. Also disposed on the FPC 27 are light sources for liveness detection 33, photo diodes for liveness detection 34, light sources for decorating illumination 35, and a photo diode array 37.

The light coupler 31 is fixed onto the cover glass 50 and an underlying spacer material 39 as shown in FIG. 3. The probe light source 29 is fixed at a proper position so that the probe light beam or a portion of the probe light beam may be projected into the coupler 31 at desired angles. The coupler 31, the spacer material 39, and the cover glass 50 can each be made of multiple layers. The photo diode array 37 is fixed at a proper position to receive the reflected probe light beam A'B' for capturing the optical image of the fingerprint pattern carried by the reflected probe light beam A'B'.

Probe light source 29 projects probe light beam AB into coupler 31 which further directs the probe light beam AB through the opening of the optional color material layer 52 onto the fingerprint sensing surface 45 on the top of the cover glass 50 to illuminate the finger in contact. The light beam AB is coupled into cover glass 50 with the help of the spacer material 39 placed underneath the cover glass 50. When nothing is placed on the top sensing surface 45 of the cover glass 50, a portion or all of the probe light beam power is reflected into the spacer 39, and this reflected light enters into coupler 31 and forms the reflected probe light beam A'B'. The reflected probe light beam A'B' is received by the matched optical sensor array 37 (e.g., a photo diode array) which converts the optical image carried by the reflected probe light beam A'B' into an array of detector signals for further processing.

When a finger 43 touches the sensing surface 45 of the cover glass 50, the fingerprint ridges 73 change the local surface reflectance as shown by the right figure in FIG. 3. A portion 61 of the probe light incident on the finger ridge is refracted as light 65 that is scattered in the finger 43, the rest is reflected as light 67 that is reflected by the finger ridge. The fingerprint valleys are separate from the sensing surface 45 and generally do not significantly change the local surface reflection at the sensing surface 45. The incident light 63 that is incident on the fingerprint valleys is reflected as light 69 that is reflected by the sensing surface 45. The reflected probe light beam A'B' carries the fingerprint signals. Similarly, when something other than a finger skin touches the sensing surface 45 of the cover glass 50, the reflected probe light beam A'B' carries the touching material information, which is different from a live fingerprint.

In the example of FIGS. 2 and 3, the materials of the coupler 31, spacer 39, and cover glass 50 are of a proper level of optical transparency so that the probe light beam can be transmitted in and through them. The refractive index of the coupler 31 is nc, the refractive index of the spacer material 39 is ns, the refractive index of the cover glass 50 is nd, and the refractive index of the touching material is nf. The probe light beam's propagating directions are decided by these materials' refractive indexes.

The desired probe light beam angles may be realized by proper design of the light source 29 and the end surface tilting angle of the coupler 31. The divergent angle of the probe light beam is controlled by the structures of the light source 29 and the shape of the coupler 31's end surface.

To obtain a clear fingerprint image without an optical lens, normally the light source 29's emitting area should be small as a point light source, or the probe light beam should be collimated. A small LED light source can be installed far away from the coupler 31 to achieve this in the optical system shown in FIG. 3.

By matching proper refractive indexes (nc, ns, nd, nf) of the materials in the optical fingerprint sensor and initiating the probe light beam incident angles, the probe light beam can be designed to be totally reflected or partially reflected at the sensing surface 45. For example, such an optical sensor can be designed so that the probe light beam is totally reflected when the touch material is water having a refractive index of about 1.33 at 589 nm, and partially reflected when the touch material is finger skin having a refractive index of about 1.44 at 589 nm.

The probe beam AB size is defined as H at the incident end of the coupler 31. The probe beam size may be W at the sensing surface 45. By matching the refractive indexes of all of the materials and the shape of the coupler 31 and spacer 39, W may be set to be greater than H. Namely, the received probe light beam A'B' may be smaller than the probe light beam at the sensing surface 45. The compression ratio is typically decided by refractive indexes nc and nd. This is an effective method to image a large area with a small detector array without using an imaging lens. In addition, by adjusting the probe light beam divergent angle and the photo diode array tilting angle, the compression ratio can be further adjusted at all dimensions. The reflection from the coupler-spacer interface and from the spacer-cover interface constitutes optical noise and can be removed in the processing of the outputs of the optical detectors in the optical sensor array 37.

In some implementations, the probe light source 29 may be modulated. The matched photo diode array should be designed to be high efficiency and to work in all optical illumination environments.

Fingerprint Sensing-Air or Vacuum Coupler

Figure 4:
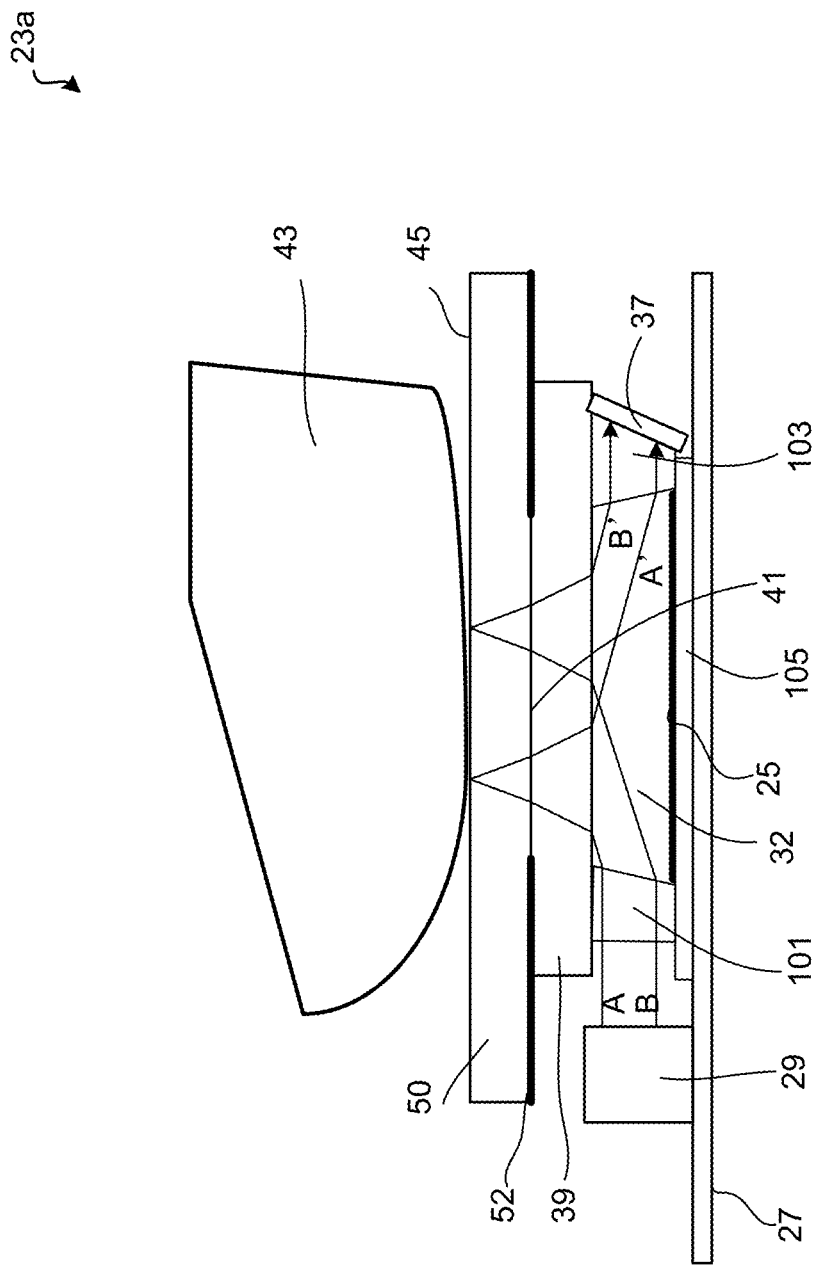
FIG. 4 is a diagram of an exemplary optical fingerprint sensor with an air or vacuum coupler.

FIG. 4 is a diagram of an exemplary optical fingerprint sensor 23a with an air or vacuum coupler. The optical fingerprint sensor 23a of FIG. 4 is similar to the optical fingerprint sensor 23 shown in FIGS. 2 and 3 in certain aspects. In the optical fingerprint sensor 23a, a coupler 32 made of air or vacuum is implemented rather than coupler 31 of FIGS. 2 and 3. Also, a light path window may be implemented to direct the probe light to the finger 43.

The probe light source 29 and a matched prism 101 cooperate to couple the probe light beam AB towards the sensing surface 45. The spacer material 39 may include anti-reflection coatings. The prism 103 helps to direct the reflected probe light beam A'B' into the photo diode array 37. The matched color layers 25 are painted on a substrate 105.

In the optical fingerprint sensor 23a, the optical configuration of the cover glass 50 in receiving the probe light is configured so that the total internal reflection does not happen in the cover glass 50. Due to differences of the optical interfacing conditions of the cover glass 50 with respect to fingerprint ridge positons and fingerprint valley positions, when a finger 43 touches the sensing surface 45, the reflectance at the fingerprint ridge positions differs from the reflectance at the fingerprint valley positions. This difference represents the fingerprint signals that are carried by the reflected probe beam A'B'.

Because the air or vacuum coupler is relatively low cost and can be of any size, this design can be used to develop optical touch panel for any size display.

Fingerprint Sensing—A Sample Design

Figure 5:
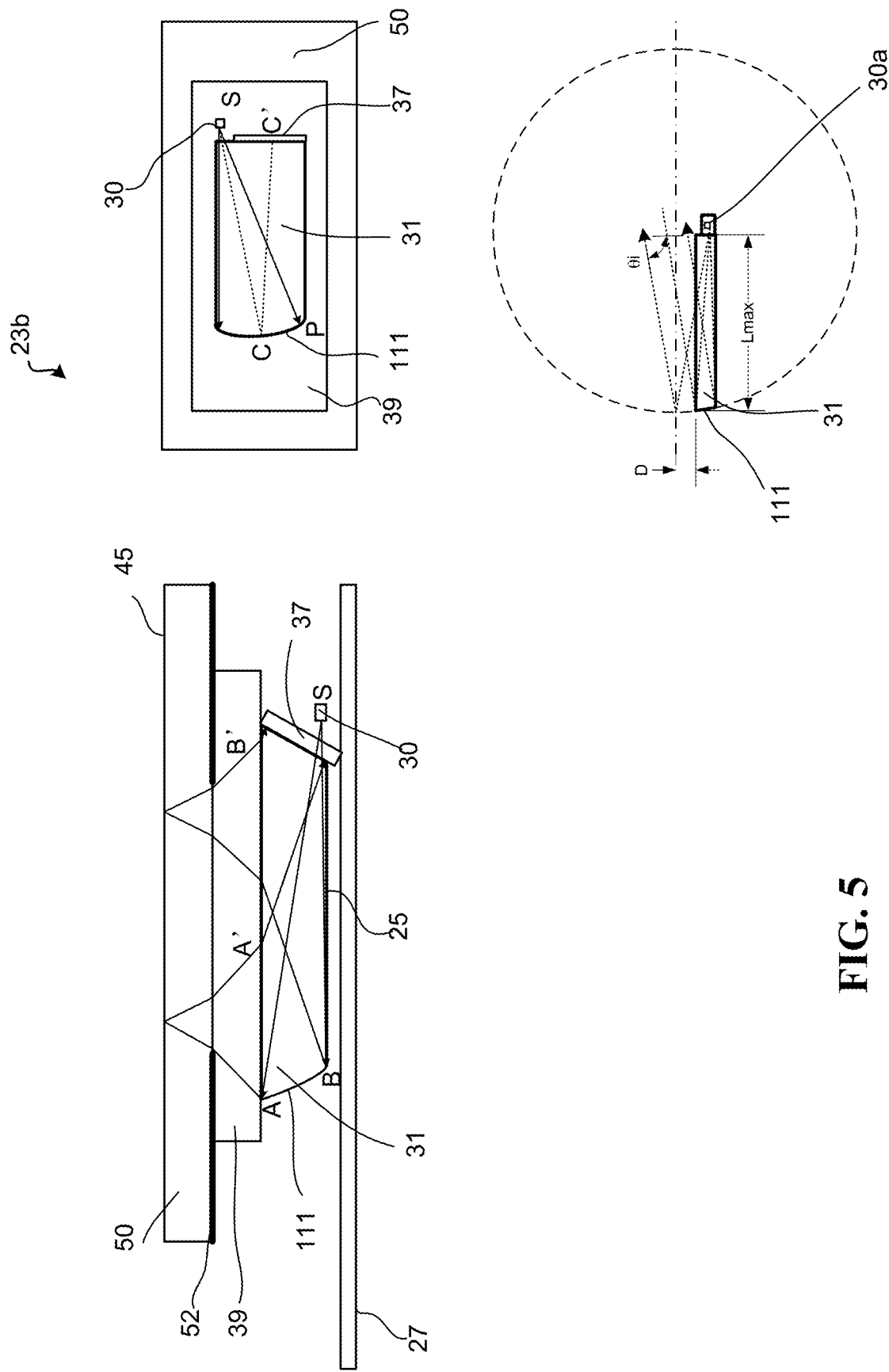
FIG. 5 is a block diagram showing an exemplary optical fingerprint sensor for fingerprint sensing.

FIG. 5 shows an exemplary optical fingerprint sensor 23b for fingerprint sensing. The optical fingerprint sensor 23b is substantially similar to the optical fingerprint sensor 23 of FIGS. 2 and 3 with some variations in the coupler 31. In the exemplary optical fingerprint sensor 23b shown in FIG. 5, one surface 111 of the coupler 31 on the left side has a curved (spherical or aspheric surface) mirror shape for imaging. The probe light source 30 is placed at the focus point of the curved mirror surface 111. A pinhole can be used on the probe light source 30 to spatially confine the probe light so that a modified light source 30a only projects a portion of the light beam to the curved mirror surface 111, and the influence of the scattered light is reduced or eliminated. The coupler 31 is set to be off center with proper distance D when the curved surface 111 is fabricated. Therefore, the curved mirror surface 111 is tilted properly so that the collimated light beam is incident into the spacer material 39 and the cover glass 50 with desired angles. For example, divergent light beam ASB is collimated and projected to the sensing surface 45. The reflected probe light beam A'B' is detected by the photo diode array 37. Correspondingly, the central light SC is reflected back to the photo diode 37 center C'.

In the example shown in FIG. 5, the light beams are propagated mostly in the coupler 31. The structure can be made compact and robust. In the example shown in FIG. 5, the material of the coupler 31 can be of single material, or multiple material compounds.

The optical fingerprint sensor of the disclosed technology can be implemented to provide one or more of the following features. The optical fingerprint sensor includes a light source, coupler, spacer, photo diode array, and cover glass. The spacer may be made of glass material, adhesive material, or even air gap or vacuum. The coupler may be made of glass material, adhesive material, or even air or vacuum. The cover glass may be partial of the display cover glass, or separate cover glass. Each of the mentioned coupler, spacer, and cover glass may be of multiple layers.

The disclosed technology provides flexibilities to control the signal contrast by matching the materials shapes and refractive indexes. By matching the probe light beam incident angle, divergent angle, and the materials of the involved coupler, spacer and cover glass, the probe light beam may be controlled to be totally reflected or partially reflected at the sensing surface for different touching materials.

The disclosed optical fingerprint sensor also provides a water-free effect. A typical smartphone cover glass has a refractive index of about 1.50. One design is to use a low refractive index material (MgF$_2$, CaF$_2$, Polymer etc.) to form the coupler 31. For example, the disclosed technology can be used to control the local probe light beam incident angle at the sensing surface 45 of the cover glass 50 to be about 68.5°. The total reflection angle is about 62.46° when water touches the sensing surface 45 of the optical fingerprint sensor, and the total reflection angle is about 73.74° when the ridges of a fingerprint touch the sensing surface 45. The total reflection angle is about 41.81° when nothing touches the sensing surface 45. In this design, at the water soaking area, the probe light is totally reflected to the photo diode array 37; at the fingerprint ridges touching positions, less than 5% of the probe light is reflected to the photo diode array; and at the dry fingerprint valleys positions, the probe light beam is also totally reflected to the photo diode array. Under this design, the optical reflection varies from the ridges to valleys of the finger and reflection caused by the fingerprint ridges generates stronger optical signals that are detected to create a high contrast optical image of the fingerprint pattern at the photo diode array 37.

Human sweat has a refractive index that is lower than the finger's skin. Therefore, based on the differences in optical reflection in the above design, the disclosed technology provides a solution to distinguish the sweat pores in the fingerprint. When air gap is used to form the coupler, the total reflection at the sensing surface does not occur. The reflectance difference among different touching materials (the fingerprint ridges, fingerprint valleys, and other contaminations) can be used to detect the fingerprint image.

Due to the light path compression effect in the above optical design, the sensing area size at the sensing surface 45 on the cover glass 50 may be greater than the photo diode array size of the photo diode array 37.

In implementations, the light source 29 may be a point light source installed at proper distance. In some implementations, the probe light beam may be collimated by spherical lenses, cylinder lenses, or aspheric lenses, or just put the light source far away. The probe light beam may be of proper divergent angle. The probe light beam may also be divergent or convergent.

Due to the light path compression effect, the coupler 31 may be very thin. For example, less than 1 mm thickness CaF$_2$ coupler can be used to realize even 10 mm sensing area size. In this example, the image compression ratio is 1:10. This helps to reduce sensor thickness and the sensor cost. The photo diode array 37 is installed on one end of the coupler instead of under the coupler. This design leaves the flexibility to apply color paint, illumination light etc. to compensate the color or decorate the sensor area.

The probe light source may be modulated to help reduce the influence of the background light. The photo diode array is designed to work well in any illumination environments. Under the above optical design, the cover glass thickness does not limit the optical fingerprint sensing. The principle can be used to build optical touch panel.

Live-Fingerprint Detection

Figure 6:
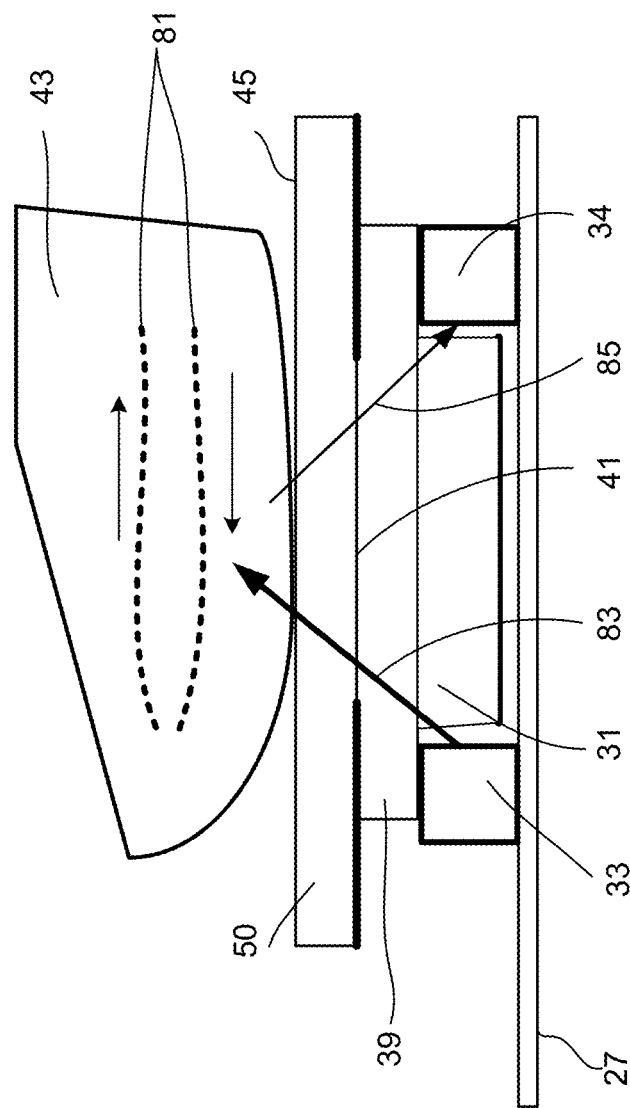
FIG. 6 is a diagram illustrating exemplary live-fingerprint detection.

FIG. 6 is a diagram illustrating exemplary live-fingerprint detection. The live-fingerprint detection can be implemented by a designed optical system such as the light source 33 and optical detector 34 in the example in FIG. 2 that are separate from the light source 29 and the optical detector array 37 for fingerprint sensing. This is shown in FIG. 6. Alternatively, the live-fingerprint detection can be performed by the same light source 29 and the optical detector array 37 for fingerprint sensing without using a separate optical sensing as shown in FIG. 2. The live fingerprint detection in FIG. 6 can be performed by a finger print sensor, such as one of the optical fingerprint sensors 23 in FIGS. 3, 23a in FIG. 4, or 23b in FIG. 5, in a way similar to what is now described below in the specific example in FIG. 6.

In FIG. 6, the light sources 33 and the receiving photodetector (PD) array 34 are isolated by the matched coupler 31 so that the emitting light beams cannot directly reach the photodetector (PD) 34 for sensing whether a fingerprint is from a live finger. The light beams propagate through the light path window 41 and transmit into the touching material, for example, a finger 43. For a live-fingerprint of a live-person, the blood flow 81 varies with the heartbeat, the pressing force against the sensor, the breathing, etc. When the light beams 83 enter the material being monitored, the tissues in the material scatter a portion of light 85 into the receiving PD array 34. By analyzing the signals received, a sequence of signals can be obtained.

The fingerprint sensor photo diode array 37 may also be used to detect the scattered light from the touching materials. The fingerprint sensing light source 29 may also be used for live-fingerprint detection. The micro movement of the fingerprint can be used to indicate whether the fingerprint is from a live-finger. A sequence of fingerprint images are used to recover the signal amplitude and bright spots distribution change with time. A fake, non-live-finger manifests different dynamics from a live-finger.

Figure 7:
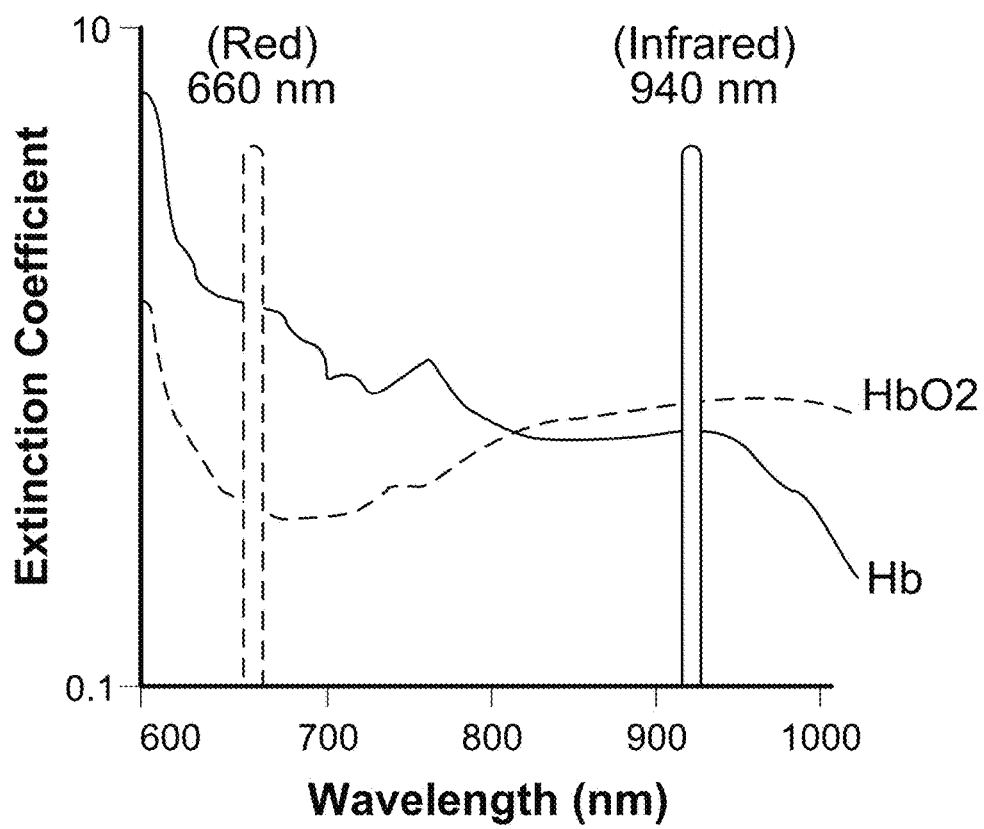
FIG. 7 shows exemplary extension coefficients of materials being monitored.
Figure 8:
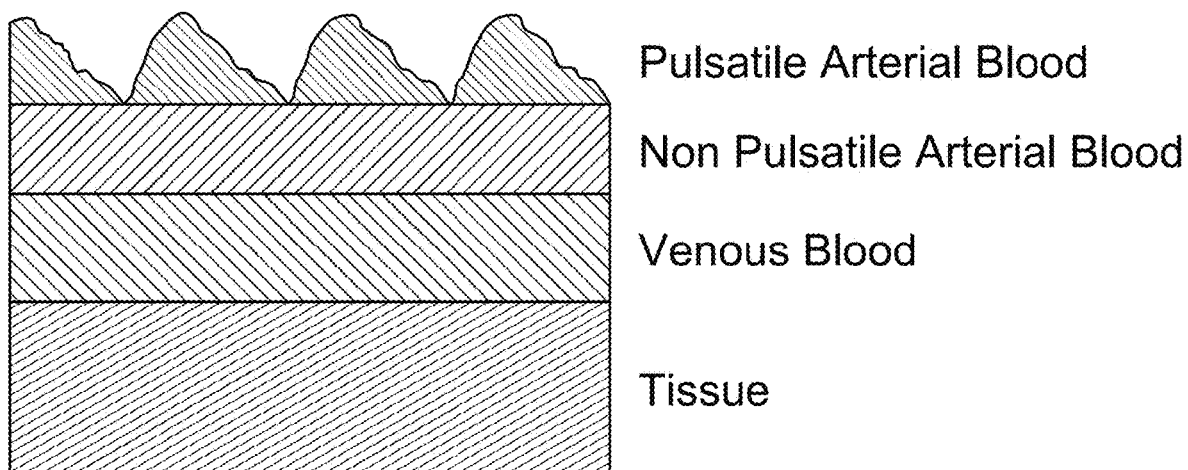
FIG. 8 shows blood flow in different parts of a tissue.

FIG. 7 shows exemplary optical extinction coefficients of materials being monitored in blood where the optical absorptions are different between the visible spectral range e.g., red light at 660 nm and the infrared range, e.g., IR light at 940 nm. By using probe light to illuminate a finger at a visible wavelength and an IR wavelength, the differences in the optical absorption can be captured determine whether the touched object is a finger from a live person. FIG. 8 shows the blood flow in different parts of a tissue. When a person' heart beats, the pulse pressure pumps the blood to flow in the arteries, so the extinction ratio of the materials being monitored in the blood changes with the pulse. The received signal carries the pulse signals. These properties of the blood can be used to detect whether the monitored material is a live-fingerprint or a fake fingerprint.

Figure 9:
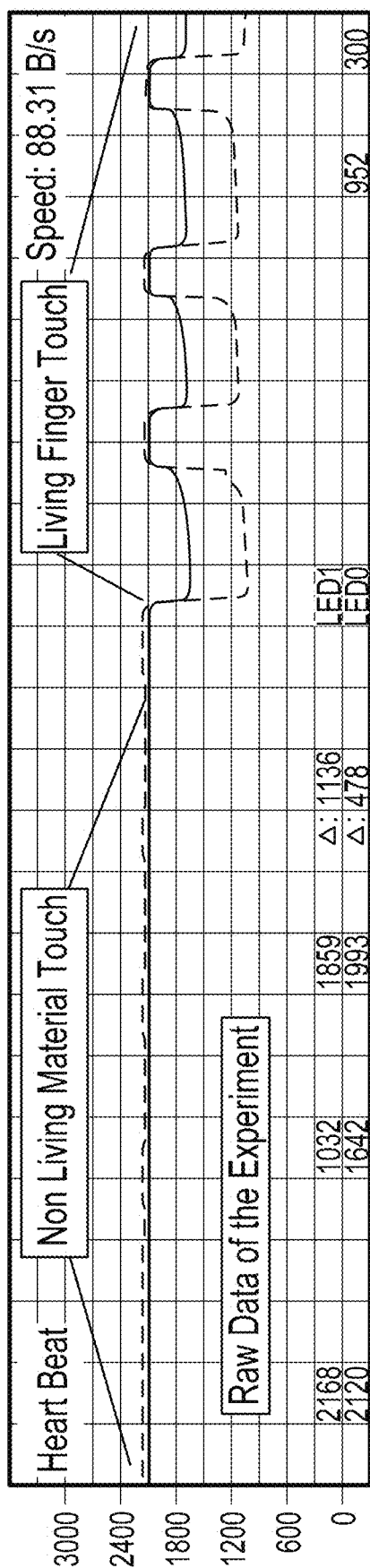
FIG. 9 shows a comparison between a nonliving material (e.g., a fake finger) and a live-finger.

FIG. 9 shows a comparison between a nonliving material (e.g., a fake finger) and a live-finger. Referring to FIG. 6, the light source 33 The optical fingerprint sensor can also operate as a heartbeat sensor to monitor a living organism. One or multiple light wavelengths are used. When two or more wavelengths of light are used, the extinction ratio difference can be used to quickly determine whether the monitored material is a living organism, such as live fingerprint. In the example shown in FIG. 9, two light sources are used to emit probe light at different wavelengths, one at a visible wavelength and another at an IR wavelength as illustrated in FIG. 7.

When a nonliving material touches the optical fingerprint sensor, the received signal reveals strength levels that are correlated to the surface pattern of the nonliving material and the received signal does not contain signal components associated with a finger of a living person. However, when a finger of a living person touches the optical fingerprint sensor, the received signal reveals signal characteristics associated with a living person, including obviously different strength levels because the extinction ratios are different for different wavelengths. This method does not take long time to know whether the touching material is a part of a living person. In FIG. 9, the pulse-shaped signal reflects multiple touches instead of blood pulse. Similar multiple touches with a nonliving material does not show the difference caused by a living finger.

In an implementation where the live-fingerprint detection can be implemented by a designed optical system such as the light source 33 and optical detector 34 in the example in FIG. 2 that are separate from the light source 29 and the optical detector array 37 for fingerprint sensing, the designated light source 33 is operated to emit probe light at the selected visible wavelength and IR wavelength, e.g., at different times, and the reflected probe light at the two different wavelengths is captured by the designated optical detector 34 to determine whether touched object is a live finger based on the above operations shown in FIGS. 7 and 9.

Alternatively, in an implementation, live-fingerprint detection can be performed by the same the light source 29 and the optical detector array 37 for fingerprint sensing without using a separate optical sensing. Under this design using the light source 29 and the optical detector array 37 for both fingerprint sensing and the live-fingerprint detection, the light source 29 is operated to emit probe light at the selected visible wavelength and IR wavelength at different times and the reflected probe light at the two different wavelengths is captured by the designated optical detector 34 to determine whether touched object is a live finger based on the above operations shown in FIGS. 7 and 9. Notably, although the reflected probe light at the selected visible wavelength and IR wavelength at different times may reflect different optical absorption properties of the blood, the fingerprint image is always captured by both the probe light the selected visible wavelength and the probe light at the IR wavelength at different times. Therefore, the fingerprint sensing can be made at both the visible wavelength and IR wavelength.

Security Level Set Up

Figure 10:
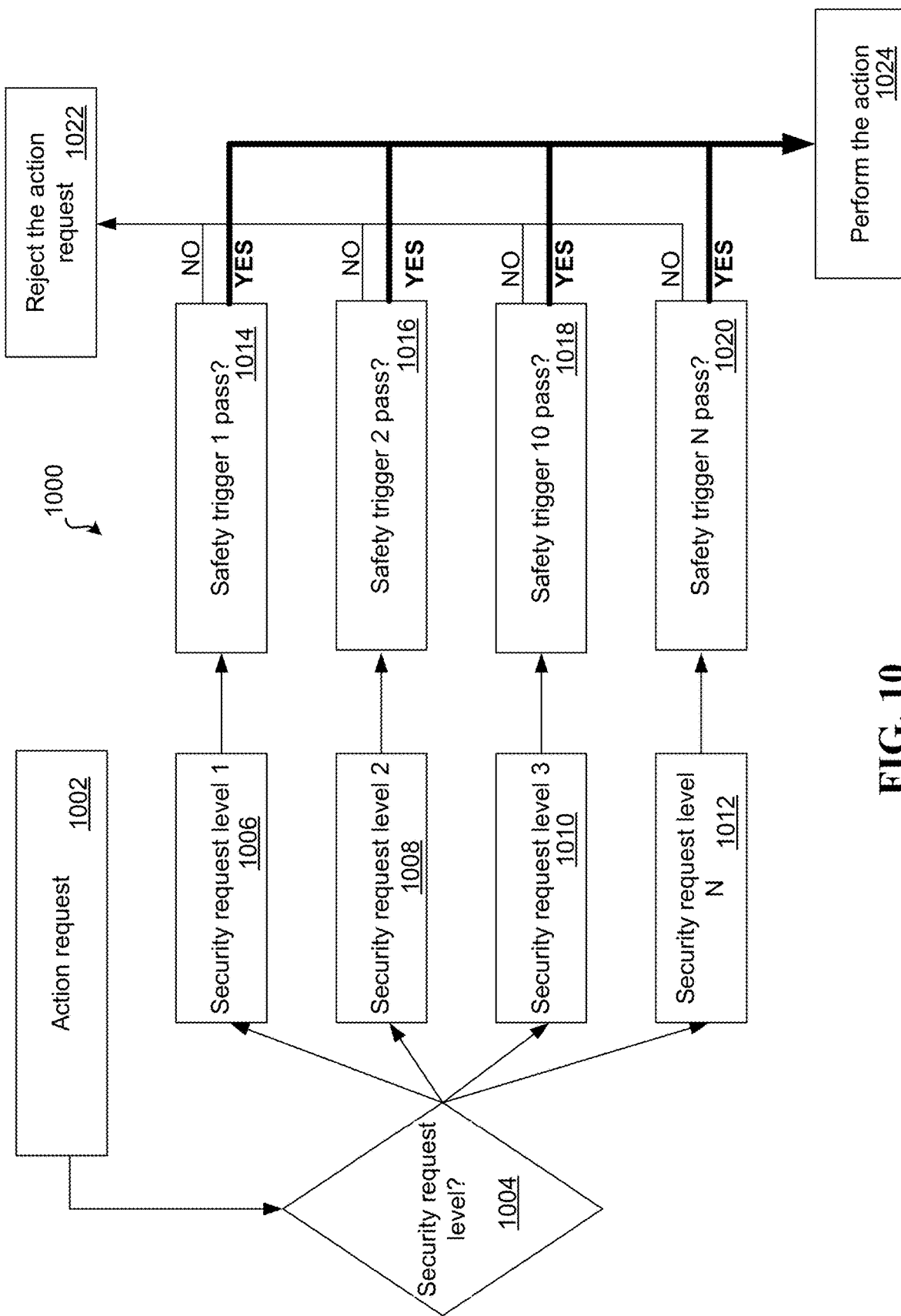
FIG. 10 shows a process flow diagram of an exemplary process 1000 for setting up different security levels for authenticating a live finger.

FIG. 10 shows a process flow diagram of an exemplary process 1000 for setting up different security levels for authenticating a live finger based on the disclosed optical sensing technology for fingerprint sensing. Different security level criterions may be set up based on the type of action requested. For example, a regular action request is required to pass security level 1 check. A request for a financial transaction for an amount below a threshold, such as under $100 payment needs to pass security level 2. A financial transaction for an amount over the threshold may require a higher security level clearance. Different security level action is triggered after different safety level evaluation. The safety levels corresponding to different security levels can be set up by combining different live-finger signatures. For example, single light source signals can be used to set up safety level 1 gate, two light source signals can be combined to set up safety level 2 gate, and so on.

The method 1000 can begin when an action is requested (1002). The requested action is analyzed to determine an appropriate security level (1004). When determined that that security level 1 (the lowest security level) is required (1006), the safety trigger level 1 is required to be passed (1014). When the fingerprint analysis passes the safety trigger level 1, the requested action is performed (1024). However, when the fingerprint analysis fails the safety trigger level 1, the requested action is denied (1022).

Similarly, when determined that that security level 2 is required (1008), the safety trigger level 1 is required to be passed (1016). When the fingerprint analysis passes the safety trigger level 1, the requested action is performed (1024). When the fingerprint analysis fails the safety trigger level 1, the requested action is denied (1022).

When determined that that security level 3 is required (1010), the safety trigger level 1 is required to be passed (1018). If the fingerprint analysis passes the safety trigger level 1, the requested action is performed (1024). If, however, the fingerprint analysis fails the safety trigger level 1, the requested action is denied (1022).

When determined that that security level N is required (1012), the safety trigger level 1 is required to be passed (1020). If the fingerprint analysis passes the safety trigger level 1, the requested action is performed (1024). If, however, the fingerprint analysis fails the safety trigger level 1, the requested action is denied (1022).

The optical fingerprint sensor of the disclosed technology can be implemented to perform live-finger detection including the following. The optical fingerprint sensor can detect whether the touching material is a live-finger and can improve the security of the sensor. Specified light sources and detectors can be used to detect whether the object touching the sensing area is a live-finger or a nonliving material. When single wavelength is used, the heartbeat detection provides a reliable criterion to detect whether the object touching the sensing area is a live-finger or a nonliving material, including the fingerprint of a live-finger. When two or more wavelengths are used, the extinction ratio of the wavelengths are compared to detect whether the object touching the sensing area is a live-finger or a nonliving material, including the fingerprint of a live-finger. The fingerprint sensor light sources and photo diode array can be used to detect whether the object touching the sensing area is a live-finger or a nonliving material, including the fingerprint of a live-finger. The dynamic fingerprint images can be used to detect whether the object touching the sensing area is a live-finger or a nonliving material, including the fingerprint of a live-finger. Multiple security level can be set up for different security requirement tasks.

Sensor Area Decorating

Figure 11:
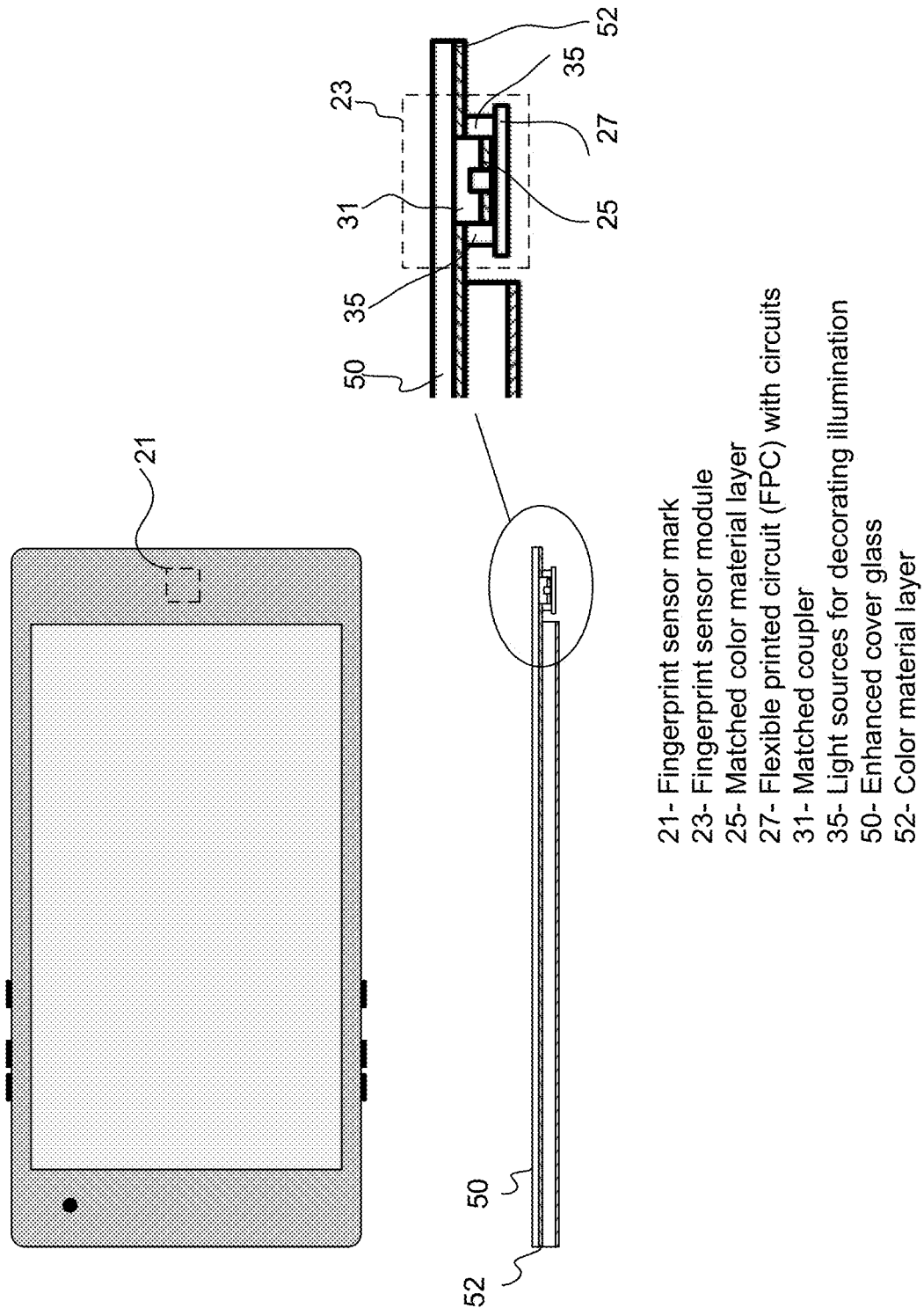
FIG. 11 is a diagram showing an exemplary optical fingerprint sensor for sensor area decorating.

FIG. 11 is a diagram showing an exemplary optical fingerprint sensor for sensor area decorating. When the optical fingerprint sensor (e.g., optical fingerprint sensor 23) is installed under the cover glass 50, an optical window should be opened for the light path. Specifically, a portion of the cover glass' color coating is removed. Because the fingerprint sensor detector is arranged to be at one end of the coupler 31, the bottom of the coupler 31 may be painted with color layers 25. The painted color layers 25 can be selected to match with the platform surface color. For example, to use same color or pattern under the coupler so that the sensor becomes invisible. In some implementations, the matched coupler 31 may also be painted with a desired or different color or pattern to achieve certain or different decorative effects or styles. The matched coupler 31 may also be painted with certain patterns or signs, such as homing button sign.

The design provides an attractive option to further decorate the sensor area. For example, different colored light waves can be used to illuminate the sensor area. This can be useful in dark environments when the bell rings on the smartphone to indicate where the fingerprint sensing area is located.

The optical fingerprint sensor can be implemented to enable various decorative elements including the following: the bottom surface of the coupler can be painted with same color or pattern layers to match with the platform surface color; the bottom surface of the coupler can be painted with different color or pattern layers to show new styles outlooking; and color light sources can be installed around the coupler to decorate the sensor area.

Fingerprint Sensor Packaged as a Separate Button

As an alternative implementation, the optical fingerprint sensors 23 in FIGS. 3, 23a in FIGS. 4, and 23b in FIG. 5 placed under a contiguous cover glass 50 can be packaged as a separate physical fingerprint sensor button with a physical demarcation with other parts of the cover glass 50.

FIG. 12 is a diagram showing an exemplary optical fingerprint sensor packaged as a separate button that is located on a front side of a mobile device where in the device panel is located. This button can function, in addition to housing the optical fingerprint sensor module, as a control button for the device, such as a home button for certain operations of the device, a wake-up button for waking up the device from a power saving mode or sleep mode or other operation button.

Figure 13:
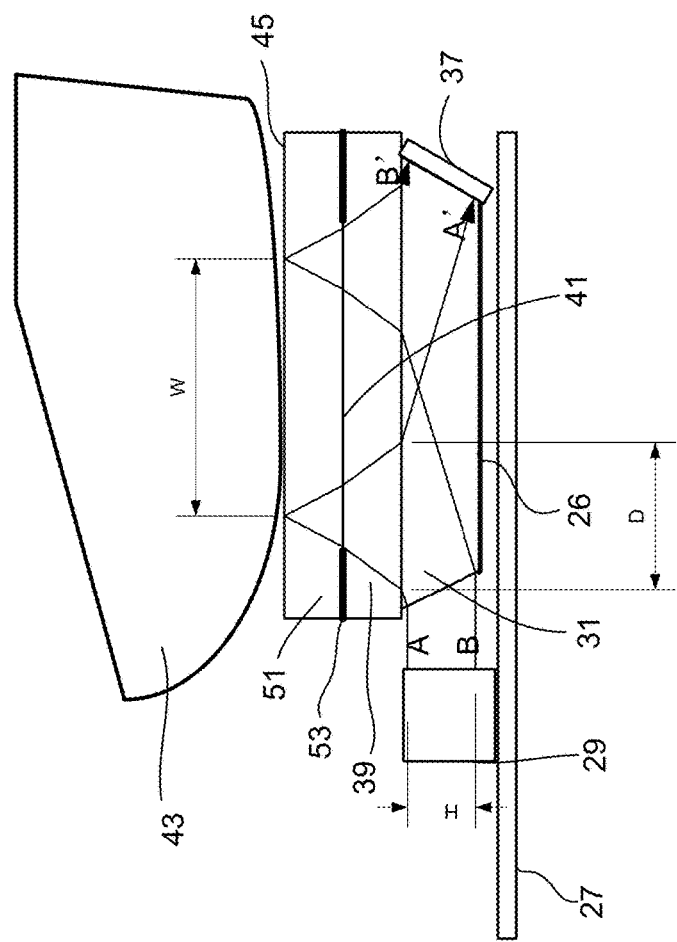
FIG. 13 is a diagram showing exemplary fingerprint and live-finger detection using the optical fingerprint sensor packaged as a separate button.

FIG. 13 is a diagram showing exemplary fingerprint and live-finger detection using the optical fingerprint sensor packaged as a separate button shown in FIG. 12. The optical fingerprint sensor of FIGS. 12 and 13 can be implemented as the optical fingerprint sensors 23 in FIGS. 3, 23a in FIGS. 4, and 23b in FIG. 5 but packaged as a separate button. Thus, the fingerprint sensing and live-finger detecting is also the same as or similar to those described above. A matched coupler 31 is used to set up the photo diode array 37 position and provide package flexibility to the visible area. All the aforementioned description regarding the different components of the optical fingerprint sensor in FIGS. 12 and 13 are substantially the same as the optical fingerprint sensors 23 in FIGS. 3, 23a in FIGS. 4, and 23b in FIG. 5 including the light sources. However, to implement the optical fingerprint sensor as a separate button, the rigidity or the strength of the material for the cover glass 51 may be required at a higher level than the designs in FIGS. 3-5 under the contiguous cover glass 50.

The spacer material 39 and the cover glass 51 add a position shift of D to the probe light beam AB. When the thickness of the cover glass 51 and the spacer material 19 is reduced to zero, specifically by excluding the cover glass and spacer, the probe light beam shift D is eliminated. For example, a 10 mm sensing size can be realized with less than 1 mm thickness $CaF_2$. Also, the photo diode array 37 should match with the light path to realize proper resolution and guarantee the performance in all illumination environments.

The optical fingerprint sensor packaged as a separate button shown in FIGS. 12 and 13 can perform the same fingerprint detection and live-finger detection as the optical fingerprint sensor of FIGS. 2-11. In addition, the optical fingerprint sensor package as a separate button can be implemented to perform the following features:

The cover glass and related spacer material feature flexibility in the thickness according to the applications. Especially, it is a practical package not to use cover glass and spacer material. Another practical design is to use a thin layer of cover glass to protect the coupler. The cover glass may be of high hardness. To use colored glass or other optical materials to build the cover is also practical. The package method provides a solution to build a compact button that can detect the fingerprint with improved security. Other mechanical parts may be integrated to enhance the rigidity or strength of the module.

The optical fingerprint sensor packaged as a separate button can be implemented to integrate the functions of fingerprint detection with live-finger detection and sensor decoration.

The above optical fingerprint sensor designs may also be implemented in other configurations. A suitable display screen for implementing the disclosed optical sensor technology can be based on various display technologies or configurations, including, a display screen having light emitting display pixels without using backlight where each individual pixel generates light for forming a display image on the screen such as an organic light emitting diode (OLED) display screens including an active matrix organic light emitting diode (AMOLED) display panel, electroluminescent display screens and other displays with backlighting such as the ubiquitous liquid crystal display (LCD) screens.

Figure 14:
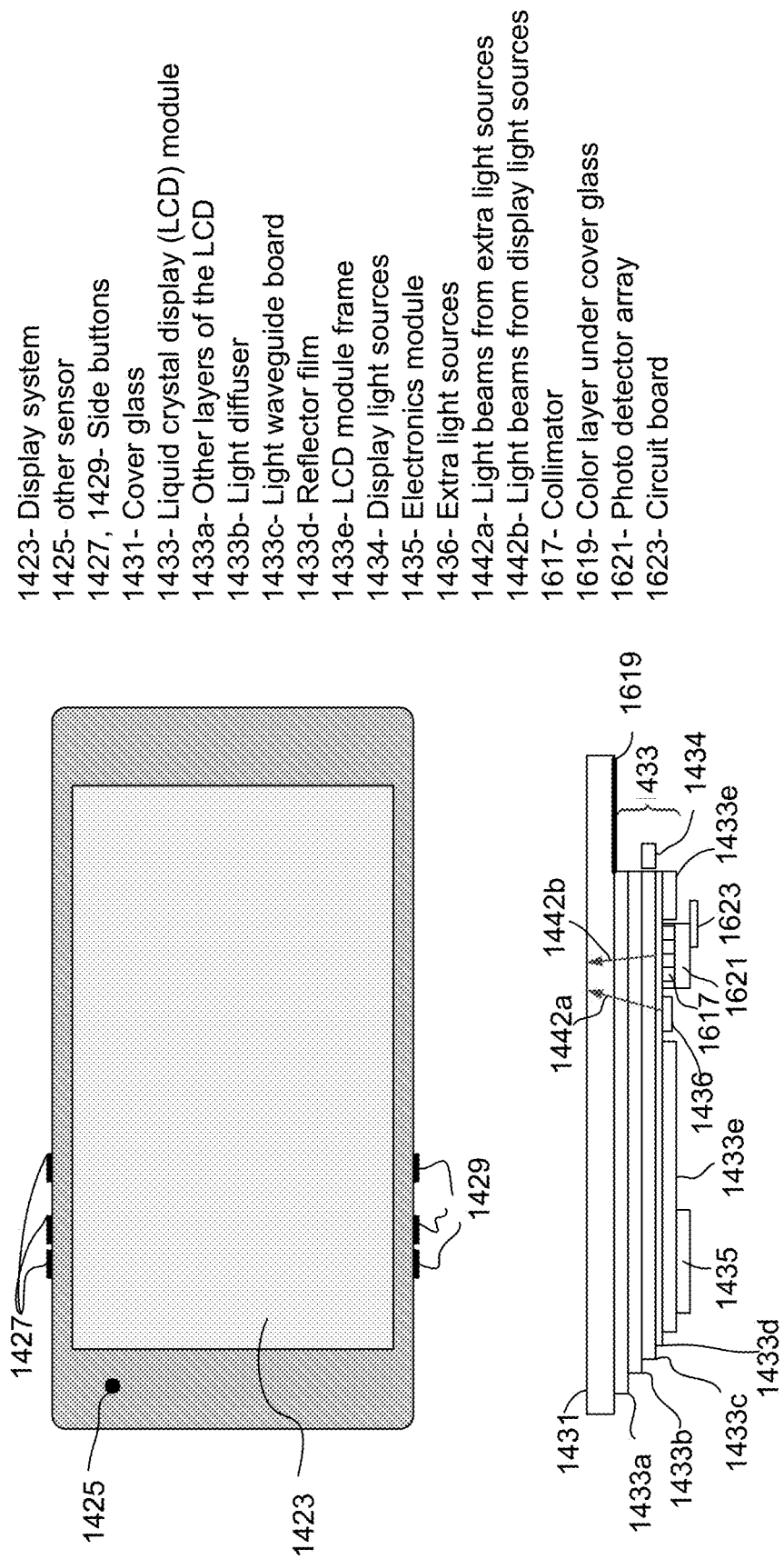
FIG. 14 illustrates a smartphone with a LCD-based touch sensing display system that implements an optical sensing module with a photo detector array under the display system.
Figure 15:
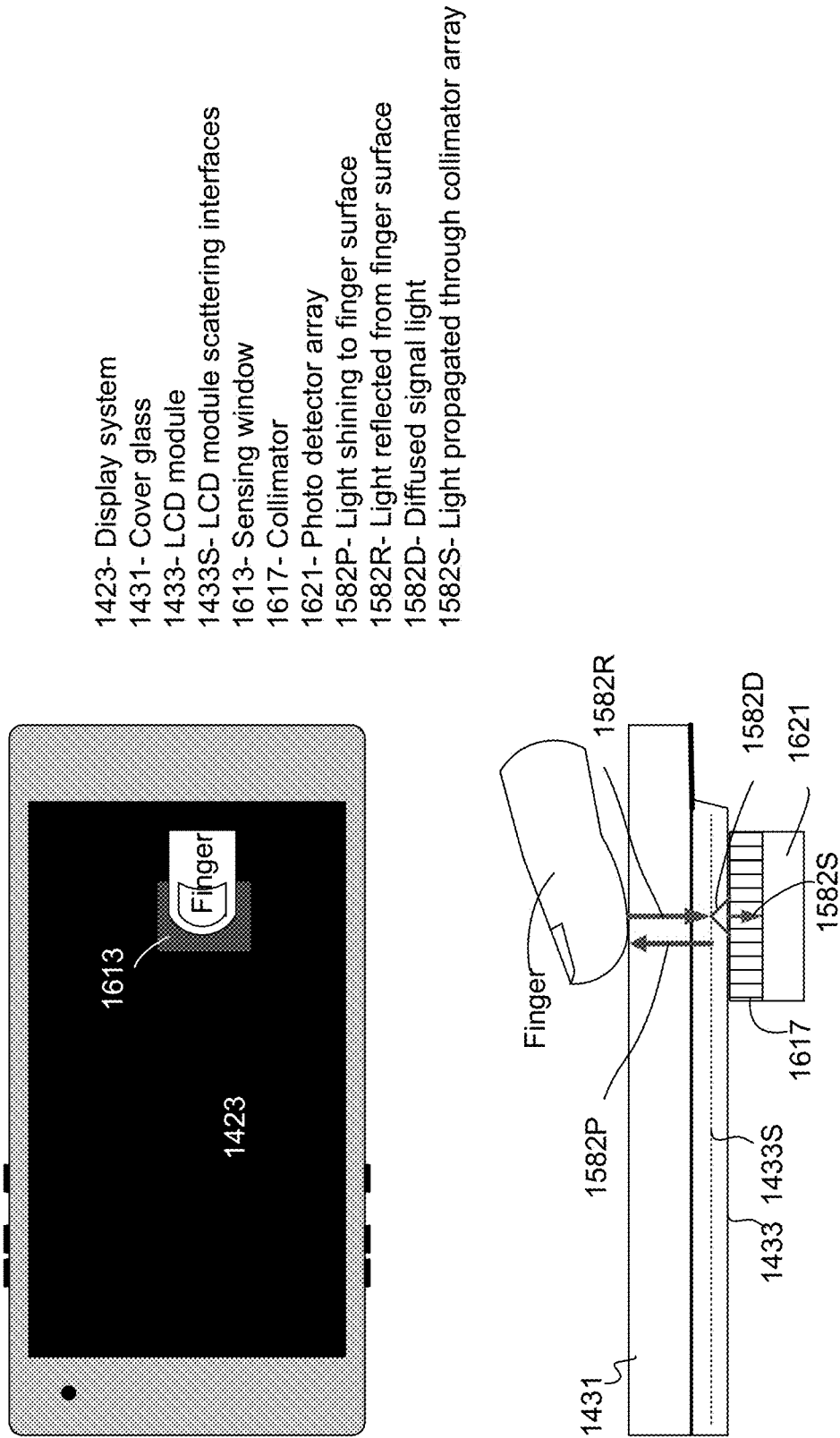
FIG. 15 further illustrates the operation of the under LCD screen optical sensor module in the example in FIG. 14.

FIGS. 14 and 15 illustrate examples of integrating optical sensor modules under liquid crystal display (LCD) screens to provide optical sensing functions including optical fingerprint sensing and optical sensing for determining whether an object in contact is from a live person. In one implementation for providing optical sensing under a LCD screen, the disclosed technology can be used to construct an electronic device capable of detecting a fingerprint by optical sensing that includes (1) a liquid crystal display (LCD) screen that provides touch sensing operations and includes a LCD display panel structure to display images; a LCD backlighting light module coupled to the LCD screen to produce backlighting light to the LCD screen for display images; (2) a top transparent layer formed over the device screen as an interface for being touched by a user for the touch sensing operations and for transmitting the light from the display structure to display images to a user; (3) an optical sensor module located below the LCD display panel structure to receive probe light that is reflected from the top transparent layer and passes through the LCD screen to detect a fingerprint; (4) one or more probe light sources, separate from the LCD backlighting light module, located under the LCD display panel structure, to produce the probe light that passes through he LCD display panel structure to illuminate a designated fingerprint sensing area on the a top transparent layer to be visibly different from a surrounding area of the top transparent layer for a user to place a finger for optical fingerprint sensing; and (5) a device control module coupled to the optical sensor module to process an output of the optical sensor module to (i) determine whether a detected fingerprint by the optical sensor module matches a fingerprint an authorized user, and (ii), in addition to detecting fingerprints, also detect a biometric parameter different form a fingerprint by optical sensing to indicate whether a touch at the top transparent layer associated with a detected fingerprint is from a live person.

In another implementation for providing optical sensing under a LCD screen, the disclosed technology can be used to provide an electronic device capable of detecting a fingerprint by optical sensing and this device includes a liquid crystal display (LCD) screen that provides touch sensing operations and includes a LCD display panel structure to display images; a top transparent layer formed over the device screen as an interface for being touched by a user for the touch sensing operations and for transmitting the light from the display structure to display images to a user; and an optical sensor module located below the display panel structure to receive probe light that passes through the LCD screen to detect a fingerprint, wherein the optical sensor module includes an optical collimator array of optical collimators that receives the probe light and an optical sensor array of optical sensors to receive the probe light from the optical collimator array.

In the disclosed examples for integrating optical sensing to LCD based on the disclosed optical sensor technology, the under LCD optical sensor can be used to detect a portion of the light that is used for displaying images in a LCD screen where such a portion of the light for the display screen may be the scattered light, reflected light or some stray light. For example, in some implementations, the image light of the LCD screen based on backlighting may be reflected or scattered back into the LCD display screen as returned light when encountering an object such as a user finger or palm, or a user pointer device like a stylus. Such returned light can be captured for performing one or more optical sensing operations using the disclosed optical sensor technology. Due to the use of the light from LCD screen for optical sensing, an optical sensor module based on the disclosed optical sensor technology is specially designed to be integrated to the LCD display screen in a way that maintains the display operations and functions of the LCD display screen without interference while providing optical sensing operations and functions to enhance overall functionality, device integration and user experience of an electronic device or system such as a smart phone, a tablet, or a mobile/wearable device.

In addition, in various implementations of the disclosed optical sensing technology, one or more designated probe light sources may be provided to produce additional illumination probe light for the optical sensing operations by the under LCD screen optical sensing module. In such applications, the light from the backlighting of the LCD screen and the probe light from the one or more designated probe light sources collectively form the illumination light for optical sensing operations.

As a specific example, FIG. 14 illustrates a smartphone with a LCD-based touch sensing display system 1423 that implements an optical sensing module with a photo detector array 1621 under the display system 1423.

The touch sensing display system 1423 is placed under a top cover glass 1431 which serves a user interface surface for various user interfacing operations, including, e.g., touch sensing operations by the user, displaying images to the user, and an optical sensing interface to receive a finger for optical fingerprint sensing and other optical sensing operations where probe light is directed from inside the device to the top cover glass 1431 to illuminate the finger. The display system 1423 is a multi-layer liquid crystal display (LCD) module 1433 that includes LCD display backlighting light sources 134 (e.g., LED lights) that provide the white backlighting for the LCD module 1433, a light waveguide layer 1433c coupled to the LCD display backlighting light sources 1434 to receive and guide the backlighting light, LCD structure layers 433a (including, e.g., a layer of liquid crystal (LC) cells, LCD electrodes, transparent conductive ITO layer, an optical polarizer layer, a color filter layer, and a touch sensing layer), a backlighting diffuser 1433b placed underneath the LCD structure layers 1433a and above the light waveguide layer 1433c to spatially spread the backlighting light for illuminating the LCD display pixels in the LCD structure layers 1433a, and an optical reflector film layer 1433d underneath the light waveguide layer 1433c to recycle backlighting light towards the LCD structure layers 433a for improved light use efficiency and the display brightness. When the LCD cells in the sensing window are turned on, most of the LCD structure layers 1433a (include liquid crystal cells, electrodes, transparent ITO, polarizer, color filter, touch sensing layer etc.) become partially transparent although the micro structure may extinct partial of the probe light energy. The light diffuser 1433b, the light waveguide 1433c, the reflector film 1433d, and the LCD module frame are treated to hold the fingerprint sensor and provide transparent or partially transparent sensing light path so that a portion of the reflected light from the top surface of the cover glass 1431 can reach a photo detector array 1621 with an under-LCD-screen optical sensor module for fingerprint sensing and other optical sensing operations. As illustrated, this optical sensor module under the LCD screen includes various fingerprint sensor parts, e.g., an optical collimator array 1617 for collimating and directing reflected probe light to the photo detector array 1621, and an optical sensor circuit module 1623 that receives and conditions the detector output signals from the photo detector array 1621. The optical collimator array 1617 can include optical collimators and may be a waveguide based image transmitter, an optical fiber array, a micro lens array, or a pinhole array. The optical collimators operate to limit the numeral aperture (NA) of the sampling image and to form corresponding image elements. Each optical collimator unit gets a part of the image of the touched portion of a target finger on the top glass cover 1431. The transmitted light beams of all the collimators collectively form a full image of the target at the photo detector array 1621. The photodiode array 1621 may be a CMOS sensor of CMOS sensing pixels, a CCD sensor array or a suitable optical sensor array that is sensitive to light.

The example illustrates includes an electronics module 1435 for the LCD display and touch sensing operations, one or more other sensors 1425 such as an optical sensor for monitoring the light level of the surroundings, optional side buttons 1427 and 1429 for controls of certain smartphone operations.

In the example in FIG. 14, the light sources in the illustrated example include the display back lighting light sources 1434 and the extra designated probe light sources 1436. The light beams 1442a from extra designated probe light sources 1436 and the light beams 1442b from the display light sources 1434 can be used as the sensor probe light for illuminating a finger in contact with the top glass cover 1431 to generate the desired reflected probe light carrying the fingerprint pattern and other information to the optical sensor module.

When the LCD cells in the sensing window are turned on, most of the LCD structure layers 1433a (include liquid crystal cells, electrodes, transparent ITO, polarizer, color filter, touch sensing layer etc.) become partially transparent although the micro structure may extinct partial of the probe light energy. The light diffuser 1433b, the light waveguide 1433c, the reflector film 1433d, and the LCD module frame are treated to hold the fingerprint sensor and provide transparent or partially transparent sensing light path.

FIG. 15 further illustrates the operation of the under LCD screen optical sensor module in the above example in FIG. 14. On the top cover glass 1431, a fingerprint sensing area or window 1613 is an area on the top surface of the top cover glass 1431 that is right above or near the underlying optical sensor module. Since the optical sensor module is underneath the LCD structure, The sensing window 1613 is part of the contiguous top surface of the top cover glass 1431 and is also part of the display area for the LCD display. Accordingly, there may be no visible physical demarcation on the top surface to indicate this sensing window 1613. This sensing window 1613 may be indicated to a user via other means to assist the user to place a finger within the sensing window 1613 for fingerprint sensing and other optical sensing operations. For example, the extra designated probe light sources 1436 may be used to illuminate the sensing window 1613 so that the area for the sensing window 1613 is distinctly different from the surrounding areas on the top cover glass and is readily visible to the user. This can be done when the LCD panel is turned off or when the LCD panel is turned on.

As shown in FIG. 15, a user presses a finger on the sensing window 613 and the probe light beam 1582P illuminates the finger 447. The finger 1447 and the cover glass 1431 reflect the probe light as a reflected signal light beam 1582R. Various scattering interfaces 1433S in the LCD module 1433 diffuses the reflected signal light beam 1582R to form diffused light beam 1582D. Individual collimator units in the collimator array 1617 select light component 1582S and guide the selected light component 1582S into corresponding photosensing detectors of the photodetector array 1621. The photosensing detectors, e.g., photodiodes or CMOS sensing detectors, generate corresponding sensor signals that contain information on the fingerprint pattern. A portion of the source light may enter the fingerprint sensor module without first going through the finger sensing area on the top surface of the LCD panel. This part of light contributes background noise and can be eliminated by calibration. Each collimator unit of the collimator array 1617 only selects the light be transmitted along its permitted direction at a relatively low optical loss to corresponding photo detectors in a part of the photodetector array 1621. Accordingly, each collimator unit in the collimator array 1617 and its corresponding photo detectors in the photodetector array 1621 operate together to define the effective detecting optical numeral aperture NA. This NA directly defines the spatial resolution of the image produced by the optical sensor module.

Based on the disclosed under LCD screen optical sensing designs, a person's finger, either in direct touch with the LCD display screen or in a near proximity about the LCD display screen, can produce the returned light back into the LCD display screen while carrying information of a portion of the finger illuminated by the light output by the LCD display screen. Such information may include, e.g., the spatial pattern and locations of the ridges and valleys of the illuminated portion of the finger. Accordingly, the optical sensor module can be integrated to capture at least a portion of such returned light to detect the spatial pattern and locations of the ridges and valleys of the illuminated portion of the finger by optical imaging and optical detection operations. The detected spatial pattern and locations of the ridges and valleys of the illuminated portion of the finger can then be processed to construct a fingerprint pattern and to perform fingerprint identification, e.g., comparing with a stored authorized user fingerprint pattern to determine whether the detected fingerprint is a match as part of a user authentication and device access process. This optical sensing based fingerprint detection by using the disclosed optical sensor technology uses the LCD display screens as an optical sensing platform and can be used to replace existing capacitive fingerprint sensors or other fingerprint sensors that are basically self-contained sensors as "add-on" components without using light from display screens or using the display screens for fingerprint sensing for mobile phones, tablets and other electronic devices.

Notably, an optical sensor module based on the disclosed optical sensor technology can be coupled to the backside of the LCD display screen without requiring a designated area on the display surface side of the LCD display screen that would occupy a valuable device surface real estate in some electronic devices such as a smartphone, a tablet or a wearable device. Such an optical sensor module can be placed under the LCD display screen that vertically overlaps with the display screen area, and, from the user's perspective, the optical sensor module is hidden behind the display screen area. In addition, because the optical sensing of such an optical sensor module is by detecting the light from the LCD display screen and is returned from the top surface of the display area, the disclosed optical sensor module does not require a special sensing port or sensing area that is separate from the display screen area. Accordingly, different from fingerprint sensors in other designs, including, e.g., Apple's iPhone/iPad devices or Samsung Galaxy smartphone models where the fingerprint sensor is located at a particular fingerprint sensor area or port (e.g., the home button) on the same surface of the display screen but located in a designated non-displaying zone that is outside the display screen area, the optical sensor module based on the disclosed optical sensor technology can be implemented in ways that would allow fingerprint sensing to be performed at any location on the LCD display screen by using unique optical sensing designs by routing the returned light from the finger into an optical sensor and by providing proper optical imaging mechanism to achieve high resolution optical imaging sensing. In this regard, the disclosed optical sensor technology provides a unique on-screen fingerprint sensing configuration by using the same top touch sensing surface that displays images and provides the touch sensing operations without a separate fingerprint sensing area or port outside the display screen area.

In addition to fingerprint detection by optical sensing, the optical sensing may be used to measure other parameters. For example, the disclosed optical sensor technology can measure a pattern of a palm of a person given the large touch area available over the entire LCD display screen (in contrast, some designated fingerprint sensors such as the fingerprint senor in the home button of Apple's iPhone/iPad devices have a rather small and designated off-screen fingerprint sensing area that is highly limited in the sensing area size not suitable for sensing large patterns). For yet another example, the disclosed optical sensor technology can be used not only to use optical sensing to capture and detect a pattern of a finger or palm that is associated with a person, but also to use optical sensing or other sensing mechanisms to detect whether the captured or detected pattern of a fingerprint or palm is from a live person's hand by a "live finger" detection mechanism based on the fact that a live person's finger tends to be moving or stretching due to the person's natural movement or motion (either intended or unintended) or pulsing when the blood flows through the person's body in connection with the heartbeat. In one implementation, the optical sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, the optical sensor module may include a sensing function for measuring a glucose level or a degree of oxygen saturation based on optical sensing in the returned light from a finger or palm. As yet another example, as a person touches the LCD display screen, a change in the touching force can be reflected in one or more ways, including fingerprint pattern deforming, a change in the contacting area between the finger and the screen surface, fingerprint ridge widening, or a blood flow dynamics change. Such changes can be measured by optical sensing based on the disclosed optical sensor technology and can be used to calculate the touch force. This touch force sensing adds more functions to the optical sensor module beyond the fingerprint sensing.

With respect to useful operation or control features in connection with the touch sensing aspect of the LCD display screen, the disclosed optical sensor technology can provide triggering functions or additional functions based on one or more sensing results from the optical sensor module to perform certain operations in connection with the touch sensing control over the LCD display screen. For example, the optical property of a finger skin (e.g., the index of refraction) tends to be different from other artificial objects. Based on this, the optical sensor module may be designed to selectively receive and detect returned light that is caused by a finger in touch with the surface of the LCD display screen while returned light caused by other objects would not be detected by the optical sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical sensor module to control the waking up circuitry operation of the LCD display screen which, for example, may include designed extra light sources for optical sensing and the designed extra light sources may turned on in a flash mode to intermittently emit flash light to the screen surface for sensing any touch by a person's finger or palm while the LCD display screen can be placed in a sleep mode to save power. In some implementations, the wake-up sensing light can be in the infrared invisible spectral range so a user will not experience any visual of a flash light.

An optical sensor module based on the disclosed optical sensor technology can be coupled to the backside of the LCD display screen without requiring creation of a designated area on the surface side of the LCD display screen that would occupy a valuable device surface real estate in some electronic devices such as a smartphone, a tablet or a wearable device. This aspect of the disclosed technology can be used to provide certain advantages or benefits in both device designs and product integration or manufacturing.

FIGS. 16A-16B, 17A-17B, 18 and 19A-19B show examples of integrating optical sensor modules under OLED screens to provide optical sensing functions.

Figure 16A:
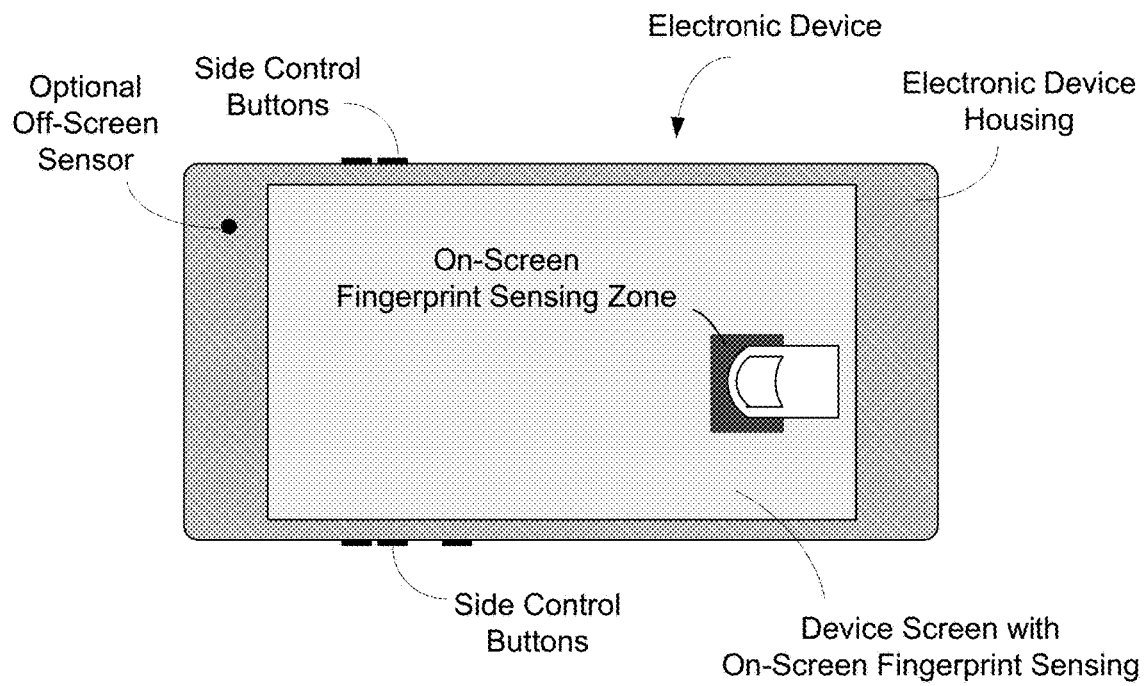
Figure 16B:
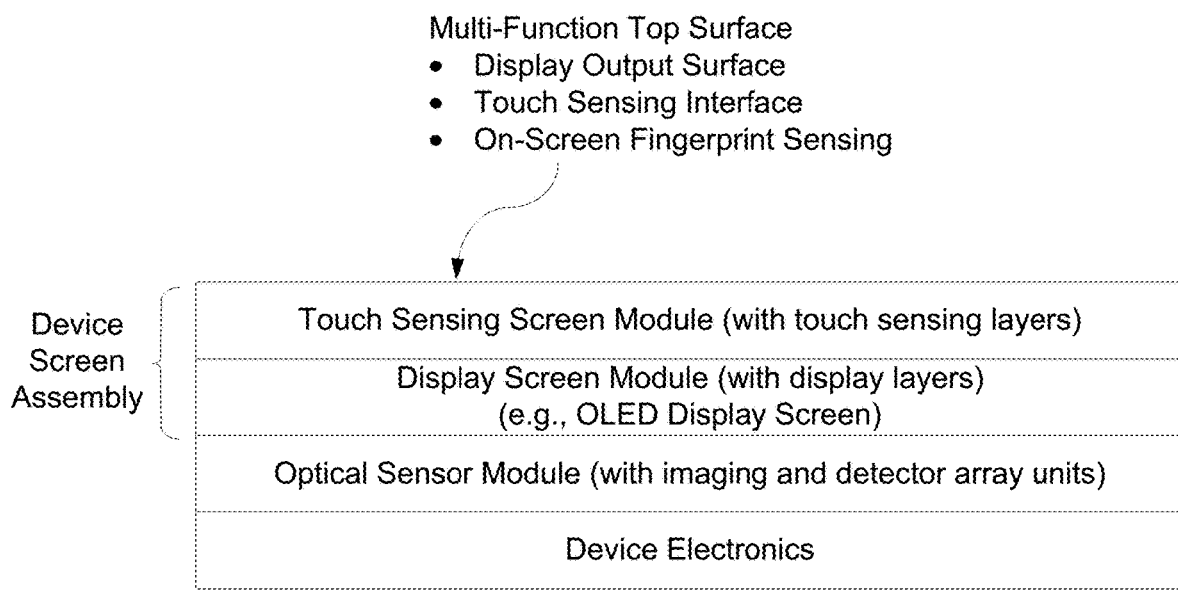

As a specific example, FIGS. 16A and 16B illustrate one exemplary implementation of an electronic device having a touch sensing display screen assembly and an optical sensor module positioned underneath the touch sensing display screen assembly. In this particular example, the display technology can be implemented by an OLED display screen or another display screen having light emitting display pixels without using backlight. The electronic device 200 can be a portable device such as a smartphone or a tablet.

FIG. 16A shows the front side of the device 200 which may resemble some features in some existing smartphones or tablets. The device screen is on the front side of the device 200 occupying either entirety, a majority or a significant portion of the front side space and the fingerprint sensing function is provided on the device screen, e.g., one or more sensing areas for receiving a finger on the device screen. As an example, FIG. 16A shows a fingerprint sensing zone in the device screen for a finger to touch which may be illuminated as a visibly identifiable zone or area for a user to place a finger for fingerprint sensing. Such a fingerprint sensing zone can function like the rest of the device screen for displaying images. As illustrated, the device housing of the device 200 may have, in various implementations, side facets that support side control buttons that are common in various smartphones on the market today. Also, one or more optional sensors may be provided on the front side of the device 200 outside the device screen as illustrated by one example on the left upper corner of the device housing in FIG. 16A.

FIG. 16B shows an example of the structural construction of the modules in the device 200 relevant to the optical fingerprint sensing disclosed in this document. The device screen assembly shown in FIG. 16B includes, e.g., the touch sensing screen module with touch sensing layers on the top, and a display screen module with display layers located underneath the touch sensing screen module. An optical sensor module is coupled to, and located underneath, the display screen assembly module to receive and capture the returned light from the top surface of the touch sensing screen module and to guide and image the returned light onto an optical sensor array of optical sensing pixels or photodetectors which convert the optical image in the returned light into pixel signals for further processing. Underneath the optical sensor module is the device electronics structure containing certain electronic circuits for the optical sensor module and other parts in the device. The device electronics may be arranged inside the device housing and may include a part that is under the optical sensor module as shown in FIG. 16B.

In implementations, the top surface of the device screen assembly can be a surface of an optically transparent layer serving as a user touch sensing surface to provide multiple functions, such as (1) a display output surface through which the light carrying the display images passes through to reach a viewer's eyes, (2) a touch sensing interface to receive a user's touches for the touch sensing operations by the touch sensing screen module, and (3) an optical interface for on-screen fingerprint sensing (and possibly one or more other optical sensing functions). This optically transparent layer can be a rigid layer such as a glass or crystal layer or a flexible layer.

One example of a display screen having light emitting display pixels without using backlight is an OLED display having an array of individual emitting pixels, and a thin film transistor (TFT) structure or substrate which may include arrays of small holes and may be optically transparent and a cover substrate to protect the OLED pixels. Referring to FIG. 16B, the optical sensor module in this example is placed under the OLED display panel to capture the returned light from the top touch sensing surface and to acquire high resolution images of fingerprint patterns when user's finger is in touch with a sensing area on the top surface. In other implementations, the disclosed under-screen optical sensor module for fingerprint sensing may be implemented on a device without the touch sensing feature. In addition, a suitable display panel may be in various screen designs different from OLED displays.

Figure 17A:
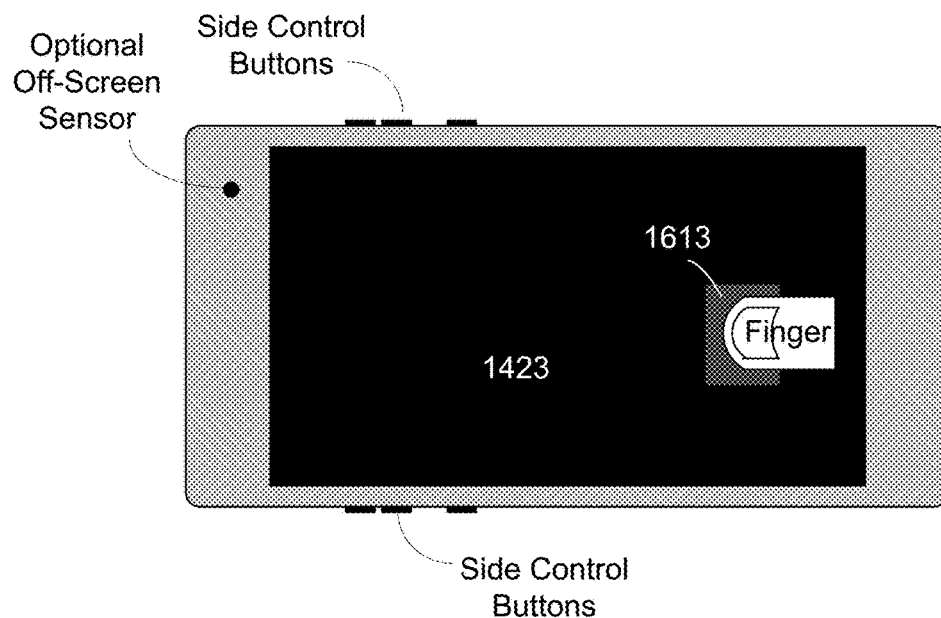
Figure 17B:
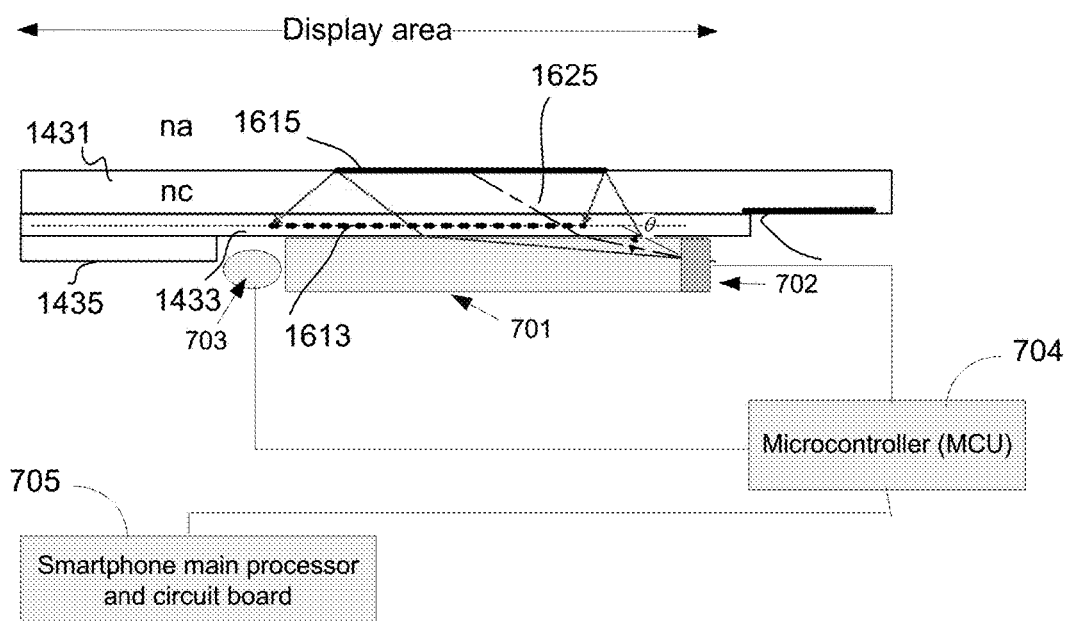

FIGS. 17A and 17B show an example of one implementation of an optical sensor module under the display screen assembly for implementing the design in FIGS. 16A and 16B. The device in FIGS. 17A and 17B include a display assembly 1423 with a top transparent layer 1431 formed over the device screen assembly 1423 as an interface for being touched by a user for the touch sensing operations and for transmitting the light from the display structure to display images to a user. This top transparent layer 1431 can be a cover glass or a crystal material in some implementations. The device screen assembly 1423 can include an OLED display module 433 under the top transparent layer 1431. The OLED display module 1433 includes, among others, OLED layers including an array of OLED pixels that emit light for displaying images. The OLED layers have electrodes and wiring structure optically acting as an array of holes and light scattering objects. The array of holes in the OLED layers allows transmission of light from the top transparent layer 1431 through the OLED layers to reach the optical sensor module under the OLED layers and the light scattering caused by the OLED layers affects the optical detection by the under-screen optical sensor module for fingerprint sensing. A device circuit module 1435 may be provided under the OLED display panel to control operations of the device and perform functions for the user to operate the device.

The optical sensor module in this particular implementation example is placed under OLED display module 1433. The OLED pixels in a fingerprint illumination zone 1613 can be controlled to emit light to illuminate the fingerprint sensing zone 1615 on the top transparent layer 1431 within the device screen area for a user to place a finger therein for fingerprint identification. As illustrated, a finger is placed in the illuminated fingerprint sensing zone 1615 as the effective sensing zone for fingerprint sensing. A portion of the reflected or scattered light in the zone 1615 illuminated by the OLED pixels in the fingerprint illumination zone 1613 is directed into the optical sensor module underneath the OLED display module 1433 and a photodetector sensing array inside the optical sensor module receives such light and captures the fingerprint pattern information carried by the received light.

In this design of using the OLED pixels in the fingerprint illumination zone 1613 within the OLED display panel to provide the illumination light for optical fingerprint sensing, the OLED pixels in the fingerprint illumination zone 1613 can be controlled to turn on intermittently with a relatively low cycle to reduce the optical power used for the optical sensing operations. For example, while the rest of the OLED pixels in the OLED panel are turned off (e.g., in a sleep mode), the OLED pixels in the fingerprint illumination zone 613 can be turned on intermittently to emit illumination light for optical sensing operations, including performing optical fingerprint sensing and waking up the OLED panel. The fingerprint sensing operation can be implemented in a 2-step process in some implementations: first, a few of the OLED pixels in the fingerprint illumination zone 1613 within the OLED display panel are turned on in a flashing mode without turning on other OLED pixels in the fingerprint illumination zone 1613 to use the flashing light to sense whether a finger touches the sensing zone 1615 and, once a touch in the zone 1615 is detected, the OLED pixels in the fingerprint illumination zone 1613 are turned on to activate the optical sensing module to perform the fingerprint sensing. Also, upon activating the optical sensing module to perform the fingerprint sensing, the OLED pixels in the fingerprint illumination zone 1613 may be operated at a brightness level to improve the optical detection performance for fingerprint sensing, e.g., at a higher brightness level than their bright level in displaying images.

In the example in FIG. 17B, the under-screen optical sensor module includes a transparent block 701 that is coupled to the display panel to receive the returned light from the top surface of the device assembly that is initially emitted by the OLED pixels in the fingerprint sensing zone 1613, and an optical imaging block 702 that performs the optical imaging and imaging capturing. Light from OLED pixels in the fingerprint illumination zone 1613, after reaching the cover top surface, e.g., the cover top surface at the sensing area 1615 where a user finger touches, is reflected or scattered back from the cover top surface. When fingerprint ridges in close contact of the cover top surface in the sensing area 1615, the light reflection under the fingerprint ridges is different, due to the presence of the skin or tissue of the finger in contact at that location, from the light reflection at another location under the fingerprint valley, where the skin or tissue of the finger is absent. This difference in light reflection conditions at the locations of the ridges and valleys in the touched finger area on the cover top surface forms an image representing an image or spatial distribution of the ridges and valleys of the touched section of the finger. The reflection light is directed back towards the OLED pixels, and, after passing through the small holes of the OLED display module 433, reaches the interface with the low index optically transparent block 701 of the optical sensor module. The low index optically transparent block 701 is constructed to have a refractive index less than a refractive index of the OLED display panel so that the returned light can be extracted out of the OLED display panel into the optically transparent block 701. Once the returned light is received inside the optically transparent block 701, such received light enters the optical imaging unit as part of the imaging sensing block 702 and is imaged onto the photodetector sensing array or optical sensing array inside the block 702. The light reflection differences between fingerprint ridges and valleys create the contrast of the fingerprint image. As shown in FIG. 17B is a control circuit 704 (e.g., a microcontroller or MCU) which is coupled to the imaging sensing block 702 and to other circuitry such as the device main processor 705 on a main circuit board.

In this particular example, the optical light path design is such the light ray enters the cover top surface within the total reflect angles on the top surface between the substrate and air interface will get collected most effectively by the imaging optics and imaging sensor array in the block 702. In this design the image of the fingerprint ridge/valley area exhibits a maximum contrast. Such an imaging system may have undesired optical distortions that would adversely affect the fingerprint sensing. Accordingly, the acquired image may be further corrected by a distortion correction during the imaging reconstruction in processing the output signals of the optical sensor array in the block 702 based on the optical distortion profile along the light paths of the returned light at the optical sensor array. The distortion correction coefficients can be generated by images captured at each photodetector pixel by scanning a test image pattern one line pixel at a time, through the whole sensing area in both X direction lines and Y direction lines. This correction process can also use images from tuning each individual pixel on one at a time, and scanning through the whole image area of the photodetector array. This correction coefficients only need to be generated one time after assembly of the sensor.

The background light from environment (e.g., sun light or room light) may enter the image sensor through OLED panel top surface, through TFT substrate holes in the OLED display assembly 1433. Such background light can create a background baseline in the interested images from fingers and is undesirable. Different methods can be used to reduce this baseline intensity. One example is to tune on and off the OLED pixels in the fingerprint illumination zone 1613 at a certain frequency F and the image sensor accordingly acquires the received images at the same frequency by phase synchronizing the pixel driving pulse and image sensor frame. Under this operation, only one of the image phases has the lights emitted from pixels. By subtracting even and odd frames, it is possible to obtain an image which most consists of light emitted from the modulated OLED pixels in the fingerprint illumination zone 1613. Based on this design, each display scan frame generates a frame of fingerprint signals. If two sequential frames of signals by turning on the OLED pixels in the fingerprint illumination zone 1613 in one frame and off in the other frame are subtracted, the ambient background light influence can be minimized or substantially eliminated. In implementations, the fingerprint sensing frame rate can be one half of the display frame rate.

A portion of the light from the OLED pixels in the fingerprint illumination zone 613 may also go through the cover top surface, and enter the finger tissues. This part of light power is scattered around and a part of this scattered light may go through the small holes on the OLED panel substrate, and is eventually collected by the imaging sensor array in the optical sensor module. The light intensity of this scattered light depends on the finger's skin color, the blood concentration in the finger tissue and this information carried by this scattered light on the finger is useful for fingerprint sensing and can be detected as part of the fingerprint sensing operation. For example, by integrating the intensity of a region of user's finger image, it is possible to observe the blood concentration increase/decrease depends on the phase of the user's heart-beat. This signature can be used to determine the user's heart beat rate, to determine if the user's finger is a live finger, or to provide a spoof device with a fabricated fingerprint pattern.

An OLED display usually has different color pixels, e.g., adjacent red, green and blue pixels form one color OLED pixels. By controlling which color of pixels within each color pixel to turn on and recording corresponding measured intensity, the user's skin color may be determined. As an example, when a user registers a finger for fingerprint authentication operation, the optical fingerprint sensor also measures intensities of the scatter light from finger at two different colors or wavelengths A and B, as measured intensities Ia and Ib, respectively. The ratio of Ia/Ib could be recorded to compare with later measurement when user's finger is placed on the sensing area to measure fingerprint. This method can help reject the spoof device which may not match user's skin color. Alternatively, as explained with respect to FIGS. 7, 8 and 9, the ratio obtained at different probe wavelengths can be used to generally determine whether the touched object is from a finger of a living person or a fake fingerprint pattern of a man-made material.

In some implementations, to provide a fingerprint sensing operation using the above described optical sensor module when the OLED display panel is not turn on, one or more extra LED light sources 703 designated for providing fingerprint sensing illumination can be placed on the side of the transparent block 701 as shown in FIGS. 17A-17B. This designated LED light 703 can be controlled by the same electronics 704 (e.g., MCU) for controlling the image sensor array in the block 702. The designated LED light 703 can be pulsed for a short time, at a low duty cycle, to emit light intermittently and to provide pulse light for image sensing. The image sensor array can be operated to monitor the light pattern reflected off the OLED panel cover substrate at the same pulse duty cycle. If there is a human finger touching the sensing area 1615 on the screen, the image that is captured at the imaging sensing array in the block 702 can be used to detect the touching event. The control electronics or MCU 704 connected to the image sensor array in the block 702 can be operated to determine if the touch is by a human finger touch. If it is confirmed that it is a human finger touch event, the MCU 704 can be operated to wake up the smartphone system, turn on the OLED display panel (or at least the off the OLED pixels in the fingerprint illumination zone 613 for performing the optical fingerprint sensing), and use the normal mode to acquire a full fingerprint image. The image sensor array in the block 702 will send the acquired fingerprint image to the smartphone main processor 705 which can be operated to match the captured fingerprint image to the registered fingerprint database. If there is a match, the smartphone will unlock the phone, and start the normal operation. If the captured image is not matched, the smartphone will feedback to user that the authentication is failed. User may try again, or input passcode.

FIGS. 18, 19A-19B and 20A-20B illustrate examples of various designs for providing optical fingerprint sensing using a under-screen optical sensor module below an OLED display screen using an array of optical collimators or pinholes for directing signal light carrying fingerprint information to the optical sensor array.

Figure 18:
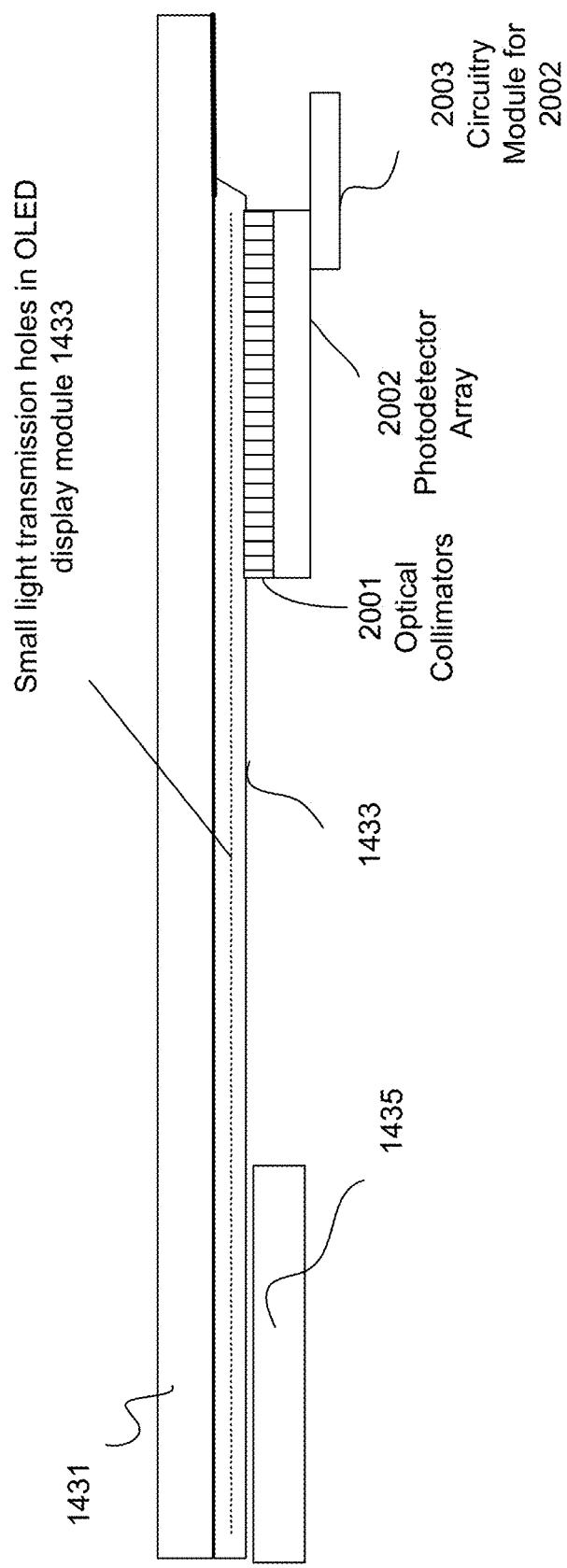

FIG. 18 shows an under-screen optical sensor module that includes an optical collimator array 2001 of optical collimators placed on top of a photodetector array 2002 for directing signal light carrying fingerprint information into different photodetectors on the photodetector array 2002. A circuitry module 2003 is coupled to the photodetector array 2002 to operate the photodetector array 2002 and to receive the output signals from photodetectors on the photodetector array 2002. The OLED display module 1433 includes small light transmission holes, e.g., holes in the TFT layer of the OLED display module, to allow the light from the top surface of the top transparent layer 1431 to pass through the OLED display module 1433 to reach the under-screen optical sensor module. The collimator array 2001 may use collimators in various designs, e.g., waveguide based image transmitters, an optical fiber array (with core or coreless), a micro lens array, a pinhole array and others. The collimators in the array 2001 are designed to limit the numeral aperture of the sampled image. Each pixel of the collimator array 2001 can be regarded as an optical detection needle. The photodiode array 2002 may be a CMOS sensor array, a CCD sensor array, a photodiode array or other photosensing array.

In operation, the OLED pixels illuminate the cover glass 1431. The light reflected from the cover glass 1431 is diffracted by the holes of the TFT structure in the OLED display module 1433. The collimator array 2001 samples the useful part of the diffracted light and pass the light to the photodiode array 2002 to form the image of the sensing area.

FIGS. 19A-19B show the operation of the optical sensor module in FIG. 18. The OLED pixels in the illumination zone 1613 in the OLED display module 1433 shine light beam 1582P to the finger in contact with the sensing zone 1615 on the cover glass 1431. The finger and the cover glass 1431 reflect a light beam 1582R. The small holes in the TFT substrate diffract the light beam 1582R to form light beam 1582D. Proper collimator units in the collimator array 2001 select light 1582S from the light beam 1582D and guide it into the proper photodetector elements of photodetector array 2002. In some OLED displays, part of the light may be directly shined towards the sensor module and may be eliminated by calibration.

FIGS. 20A-20B show an exemplary implementation of the design in FIG. 18 and FIGS. 19A-19B. The optical collimator array 2001 in this example includes an array of optical collimators 903 and an optical absorption material 905 filled between the optical collimators 903 to absorb light to reduce cross talk between different optical collimators. Each collimator 903 of the collimator array 2001 may be channels that are extended or elongated along a direction perpendicular to the display panel and lets the light be transmitted along its axis with a low loss and the collimator array 2001 is designed to reduce optical crosstalk between different optical collimators and to maintain a desired spatial resolution in the optical sensing. In some implementations, one optical collimator may correspond to only one photodetector in the photodetector array 2002. In other implementations, one optical collimator may correspond to two or more photodetectors in the photodetector array 2002. As illustrated in FIG. 20B, the axis of each collimator unit or elongated channel may be perpendicular to the display screen surface in some designs and may be slanted with respect to the display surface. In operation, only the light that propagates along a collimator axis carries the image information. For example, the proper incident light 1582P is reflected to form light 1582R. Light 1582R is then diffracted by the small holes of the TFT and expanded to light 1582D. The light portion 1582S is transmitted into the photodiode array 2002. The light portion 1582E away from the axis is absorbed by the filling material. The reflectance on the cover glass surface 1431 carries the fingerprint information. Other OLED pixels emit light 901 which is at an angle with respect to the collimator unit axis and thus may be blocked. A part of the reflected light, such as 901E, transmits into a corresponding optical collimator to reach the photodetector array 2002.

The optical collimator array can be made by different techniques, including, e.g., etching holes through a flat substrate, forming a light waveguide array, forming a micro lens array matching with optical filters, using coreless optical fiber bundle, or printing collimators on a transparent sheet. The desired features for such a collimator array include: (1) sufficient transmission contrast between the light component that propagates along the axis and the component that propagates off the axis so that the collimators ensures the desired spatial resolution in the optical sensing of the fingerprint pattern at the photodetector array; (2) the permitted transmission numeral aperture be sufficiently small to realize a desired high spatial resolution for the optical sensing.

Various optical collimator array designs may be used. Each optical collimator in the optical collimator array is structured to perform spatial filtering by transmitting light in directions along or close to an axis of the optical collimator while blocking light in other directions and to have a small transmission numeral aperture to achieve a high spatial resolution by the array of optical collimators. The collimator element aperture and the pitch (i.e., the distance between two nearby collimator elements) can be designed to achieve a desired spatial resolution for the optical fingerprint sensing.

Figure 21:
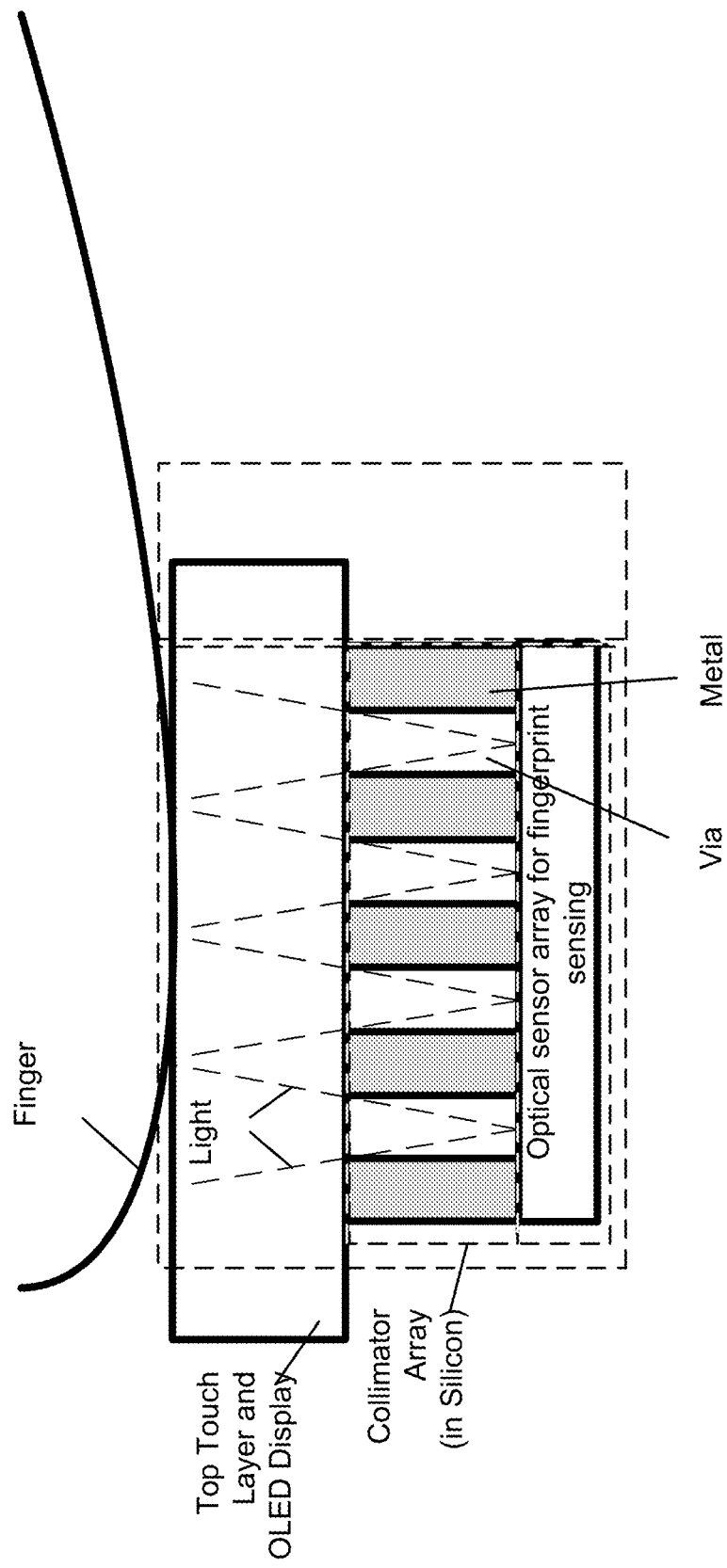
FIG. 21 shows an example of a collimator design that is part of the CMOS structure by using aligned holes in two different metal layers in the CMOS structure.

FIG. 21 shows an example of a collimator design that is part of the CMOS structure by using aligned holes in two different metal layers in the CMOS structure. Each collimator in the array is an elongated channel along a direction that is perpendicular to the display panel.

In the above implementations of optical collimators for directing light from a finger on the top of the display screen into the optical sensor array for fingerprint sensing, the direction of the optical collimators may be either perpendicular to the top touch surface above the LCD or OLED display screen as shown in FIGS. 14, 15, 18, 19A-19B and 21 to collect returned probe light from the finger for fingerprint sensing, a majority of which is in a light direction perpendicular to the top touch surface. In practice, when a touched finger is dry, the image contrast in the detected images in the optical sensor array by sensing such returned probe light that is largely perpendicular to the top touch surface is lower than the same image obtained from returned probe light that is at an angle with respect to the perpendicular direction of the top touch surface. This is in part because optical sensing of angled returned light spatially filters out the strong returned light from the top touch surface that is mostly perpendicular to the top touch surface. In consideration of this aspect of the optical sensing of the returned probe light from the top touch surface, the optical collimators may be oriented so that the axis of each collimator unit may be slanted with respect to the top touch surface as shown in the example in FIG. 20B.

In fabrication, however, it is more complex and costly to fabricate slanted collimators. One way to use perpendicular optical collimators as shown in FIGS. 14, 15, 18, 19A-19B and 21 while still achieving a higher contrast in the optical sensing by selectively detecting angled returned light from the top touch surface is to provide an optical deflection or diffraction device or layer between the perpendicular optical collimators as shown in FIGS. 14, 15, 18, 19A-19B and 21 and the returned light from the top touch surface prior to entering the perpendicular optical collimators. This optical deflection or diffraction device or layer can be, in some implementations, between the OLED/LCD display panel and the perpendicular optical collimators to select only returned probe light that is at some slanted angle to enter the perpendicular optical collimators for optical detection by the optical detector array on the other end of the perpendicular optical collimators while blocking or reducing the amount of the returned probe light from the top touch surface that is perpendicular to the top touch surface from entering the optical collimators. This optical deflection or diffraction device or layer may be implemented in various forms, including, e.g., an array of prisms, an optical layer with a diffraction pattern, or other devices located between the optical collimators and the display panel to select angled probe light returned from the display panel to enter the optical collimators while reducing an amount of the returned probe light that is perpendicular to the display panel and enters the optical collimators.

FIGS. 22A and 22B show an example of an optical fingerprint senor under an OLED/LCD display panel having an optical deflection or diffraction device or layer.

As shown in FIG. 22A, each collimator 2001 in the collimator array may be an extended channel along an axis vertical or perpendicular to the display surfaces. A viewing angle adaptor optical layer 2210 is used to adjust the viewing angle of the returned probe light from the display panel and is located between the optical collimators 2001 and the display panel to select angled probe light returned from the display panel to enter the optical collimators 2001 while reducing an amount of the returned probe light that is perpendicular to the display panel and enters the optical collimators 2001.

FIG. 22B shows more detail of the viewing angle adaptor optical layer 2210 and the major probe light paths. For example, the viewing angle adaptor optical layer 2210 may be implemented as a diffraction pattern layer such as a prism structure 2210a. Only the returned probe light 1582a and 1582b from the finger with proper incident angles out of the display panel can be bent to transmit through the collimator 2001. In comparison, the returned probe light that is perpendicular to the display panel is directed by the viewing angle adaptor optical layer 2210 to be away from the original direction that is perpendicular to the display panel and thus becomes off-axis incident light to the optical collimator 2001. This reduces the amount of the returned probe light that is perpendicular to the display panel and that can enter the optical collimator 2001.

When the viewing angle is adjusted properly, the receiving light from different places 2263a and 2263b of the fingerprint valley carried the fingerprint information. For example, under same illumination, light 1582a may be stronger than light 1582b because of the viewing angel and the fingerprint profiles of the fingertip skin. In other words, the detection can see some level of fingerprint shade. This arrangement improves the detection when the finger is dry.

The optical sensors for sensing optical fingerprints disclosed above can be used to capture high quality images of fingerprints to enable discrimination of small changes in captured fingerprints that are captured at different times. Notably, when a person presses a finger on the device, the contact with the top touch surface over the display screen may subject to changes due to changes in the pressing force.

Referring to FIG. 23, the contact profile area increases with an increase in the press force, meanwhile the ridge-print expands with the increase in the press force. Conversely, the contact profile area decreases with an decrease in the press force, meanwhile the ridge-print contracts or shrinks with the decrease in the press force. FIG. 23 shows two different fingerprint patterns of the same finger under different press forces: the lightly pressed fingerprint 2301 and the heavily pressed fingerprint 2303. The returned probe light from a selected integration zone 2305 of the fingerprint on the touch surface can be captured by a portion of the optical sensors on the optical sensor array that correspond to the selected integration zone 2305 on the touch surface. The detected signals from those optical sensors are analyzed to extract useful information as further explained below.

When a finger touches the sensor surface, the finger tissues absorb the light power thus the receiving power integrated over the photo diode array is reduced. Especially in the case of total inner reflection mode that does not sense the low refractive index materials (water, sweat etc.), the sensor can be used to detect whether a finger touches the sensor or something else touches the sensor accidentally by analyzing the receiving power change trend. Based on this sensing process, the sensor can decide whether a touch is a real fingerprint touch and thus can detect whether to wake up the mobile device based on whether the touch is a real finger press. Because the detection is based on integration power detection, the light source for optical fingerprint sensing at a power saving mode.

In the detailed fingerprint map, when the press force increases, the fingerprint ridges expands, and more light is absorbed at the touch interface by the expanded fingerprint ridges. Therefore within a relatively small observing zone 2305, the integrated received light power change reflects the changes in the press force. Based on this, the press force can be detected.

Accordingly, by analyzing the integrated received probe light power change within a small zone, it is possible to monitor time-domain evolution of the fingerprint ridge pattern deformation. This information on the time-domain evolution of the fingerprint ridge pattern deformation can then be used to determine the time-domain evolution of the press force on the finger. In applications, the time-domain evolution of the press force by the finger of a person can be used to determine the dynamics of the user's interaction by the touch of the finger, including determining whether a person is pressing down on the touch surface or removing a pressed finger away from the touch surface. Those user interaction dynamics can be used to trigger certain operations of the mobile device or operations of certain apps on the mobile device. For example, the time-domain evolution of the press force by the finger of a person can be used to determine whether a touch by a person is an intended touch to operate the mobile device or an unintended touch by accident and, based on such determination, the mobile device control system can determine whether or not to wake up the mobile device in a sleep mode.

In addition, under different press forces, a finger of a living person in contact with the touch surface can exhibit different characteristics in the optical extinction ratio obtained at two different probe light wavelengths as explained with respect FIGS. 7, 8 and 9. Referring back to FIG. 23, the lightly pressed fingerprint 2301 may not significantly restrict the flow of the blood into the pressed portion of the finger and thus produces an optical extinction ratio obtained at two different probe light wavelengths that indicates a living person tissue. When the person presses the finger hard to produce the heavily pressed fingerprint 2303, the blood flow to the pressed finger portion may be severely reduced and, accordingly, the corresponding optical extinction ratio obtained at two different probe light wavelengths would be different from that of the lightly pressed fingerprint 2301. Therefore, the optical extinction ratios obtained at two different probe light wavelengths vary under different press forces and different blood flow conditions. Such variation is different from the optical extinction ratios obtained at two different probe light wavelengths from pressing with different forces of a fake fingerprint pattern of a man-made material.

Therefore, the optical extinction ratios obtained at two different probe light wavelengths can also be used to determine whether a touch is by a user's finger or something else. This determination can also be used to determine whether to wake up the mobile device in a sleep mode.

For yet another example, the disclosed optical sensor technology can be used to monitor the natural motions that a live person's finger tends to behave due to the person's natural movement or motion (either intended or unintended) or pulsing when the blood flows through the person's body in connection with the heartbeat. The wake-up operation or user authentication can be based on the combination of the both the optical sensing of the fingerprint pattern and the positive determination of the presence of a live person to enhance the access control. For yet another example, the optical sensor module may include a sensing function for measuring a glucose level or a degree of oxygen saturation based on optical sensing in the returned light from a finger or palm. As yet another example, as a person touches the display screen, a change in the touching force can be reflected in one or more ways, including fingerprint pattern deforming, a change in the contacting area between the finger and the screen surface, fingerprint ridge widening, or a blood flow dynamics change. Those and other changes can be measured by optical sensing based on the disclosed optical sensor technology and can be used to calculate the touch force. This touch force sensing can be used to add more functions to the optical sensor module beyond the fingerprint sensing.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An electronic device having an optical fingerprint sensing module, comprising:
   a display panel that displays images and contents and receives user contact inputs; and
   an optical sensor module placed underneath the display panel and configured to detect a presence of a received contact input associated with a fingerprint to generate a first signal indicative of an image of a spatial pattern of the fingerprint and a second signal indicative of a biometric marker that is different from the spatial pattern of the fingerprint and represents a property of a live person, the optical sensor module including an optical sensor array positioned to receive reflected probe light that carries information of the received contact input and to produce an optical sensor signal,
   wherein the optical sensor module captures different fingerprint patterns at different times to monitor time-domain evolution of the fingerprint ridge pattern deformation that indicates time-domain evolution of a press force from the contact input, and
   wherein the optical sensor module is structured to measure the reflected probe light at two or more different wavelengths to compare extinction ratios of the reflected probe light at the two or more different wavelengths as the second signal indicative of whether the received contact is from the live person.

2. The device of claim 1, wherein the optical sensor module is structured to measure time-domain evolution of the press force from the contact input to determine whether the received contact is from the live person.

3. The device as in claim 1, further comprising:
   circuitry communicatively coupled to receive the optical sensor signal to process the first signal to determine whether the detected image matches a fingerprint pattern of an authorized user and to process the second signal to determine whether the biometric marker indicates that the contact input associated with the fingerprint is from a finger of the live person.

4. The device as in claim 3, wherein the circuitry operates to wake up the device from a sleep mode based on the time-domain evolution of the fingerprint ridge pattern deformation.

5. The device as in claim 1, wherein the display panel is a liquid crystal display panel, and wherein the device further includes a probe light source to produce probe light to illuminate a part of the display panel to optically detect a presence of the received contact input.

6. The device as in claim 5, wherein the probe light source is structured to emit the probe light at two or more different wavelengths; and wherein the optical sensor module is structured to measure a time-domain evolution of the press force from the contact input to determine whether the received contact is from the live person.

7. The device as in claim 1, wherein the display panel is an organic light emitting display panel that includes display pixels emitting light to form images, and wherein the probe light is from display pixels of the organic light emitting display panel.

8. The device as in claim 7, wherein the optical sensor module is structured to measure reflected probe light at the two or more different wavelengths emitted by the organic light emitting display panel to compare the extinction ratios of the probe light at the two or more different wavelengths as the second signal indicative of whether the received contact is from the live person.

9. The device as in claim 1, wherein the optical sensor module includes an optical collimator array of optical collimators located between the display panel and the optical sensor array to spatially select reflected probe light to enter the optical sensor array.

10. The device as in claim 9, wherein the optical collimators are channels that are extended along a direction perpendicular to the display panel.

11. The device as in claim 10, wherein the optical sensor module further includes an optical layer between the optical collimators and the display panel to select angled probe light returned from the display panel to enter the optical collimators while reducing an amount of the reflected probe light that is perpendicular to the display panel and enters the optical collimators.

12. An electronic device having an optical fingerprint sensing module, comprising:
a display panel that displays images and contents and receives user contact inputs; and
an optical sensor module placed underneath the display panel and configured to detect a presence of a received contact input associated with a fingerprint to generate a first signal indicative of an image of a spatial pattern of the fingerprint and a second signal indicative of a biometric marker that is different from the spatial pattern of the fingerprint and represents a property of a live person,
wherein the optical sensor module includes an optical sensor array positioned to receive reflected probe light that carries information of the received contact input and to produce an optical sensor signal, and an optical collimator array located between the display panel and the optical sensor array to spatially filter the reflected probe light for optical detection by the optical sensor array, and
wherein the optical sensor module is structured to determine extinction ratios of the reflected probe light at two or more different wavelengths.

13. The device as in claim 12, wherein the optical sensor module further includes an optical layer between the optical collimators and the display panel to select angled probe light returned from the display panel to enter the optical collimators while reducing an amount of the reflected probe light that is perpendicular to the display panel and enters the optical collimators.

14. The device as in claim 13, wherein the optical layer includes an optical diffraction pattern that diffracts the returned probe light to direct the angled probe light returned from the display panel to enter the optical collimators.

15. The device as in claim 13, wherein the optical collimators are elongated channels in a direction perpendicular to the display panel and the optical layer between the optical collimators and the display is structured to direct the angled probe light from the display panel to be substantially perpendicular to the display panel to enter the optical collimators while directing a portion of the probe light from the display panel that is perpendicular to the display panel to be away from the direction of the optical collimators.

16. The device as in claim 12, wherein the display panel is a liquid crystal display panel, and wherein the device further includes a probe light source to produce probe light to illuminate a part of the display panel to optically detect the presence of the received contact input.

17. The device as in claim 16, wherein the light source is structured to emit the probe light at two or more different wavelengths; and wherein the optical sensor module is structured to measure time-domain evolution of a press force from the contact input to determine whether the received contact is from the live person.

18. The device as in claim 12, wherein the display panel is an organic light emitting display panel that includes display pixels emitting light to form images, and wherein the probe light to illuminate a part of the display panel to optically detect the presence of the received contact input is from display pixels of the organic light emitting display panel.

19. The device as in claim 18, wherein the optical sensor module is structured to measure returned probe light at two or more different wavelengths emitted by the organic light emitting display panel to compare the extinction ratios of the probe light at the two or more different wavelengths as the second signal indicative of whether the received contact is from the live person.

* * * * *